United States Patent
Eddy et al.

(10) Patent No.: US 9,097,237 B2
(45) Date of Patent: Aug. 4, 2015

(54) TOOLS AND METHODS FOR UPTOWER MAINTENANCE

(71) Applicant: Broadwind Energy, Inc., Cicero, IL (US)

(72) Inventors: Jason W. Eddy, Madison, SD (US); Jesse E. Elliott, Yankton, SD (US); Michael A. Sebert, Howard, SD (US)

(73) Assignee: Broadwind Energy, Inc., Cicero, IL (US)

( * ) Notice: Subject to any disclaimer, the term of this patent is extended or adjusted under 35 U.S.C. 154(b) by 0 days.

(21) Appl. No.: 14/153,708

(22) Filed: Jan. 13, 2014

(65) Prior Publication Data

US 2014/0259590 A1   Sep. 18, 2014

Related U.S. Application Data

(60) Provisional application No. 61/783,721, filed on Mar. 14, 2013.

(51) Int. Cl.
| | |
|---|---|
| *F03D 11/00* | (2006.01) |
| *F03D 1/00* | (2006.01) |
| *B66C 23/16* | (2006.01) |
| *F16H 57/023* | (2012.01) |
| *F16H 57/02* | (2012.01) |

(52) U.S. Cl.
CPC .......... *F03D 11/0008* (2013.01); *B66C 23/166* (2013.01); *F03D 1/003* (2013.01); *F05B 2240/916* (2013.01); *F16H 57/023* (2013.01); *F16H 2057/02078* (2013.01); *Y02E 10/722* (2013.01); *Y02E 10/728* (2013.01); *Y10T 29/49464* (2015.01); *Y10T 29/49721* (2015.01); *Y10T 29/49826* (2015.01)

(58) Field of Classification Search
CPC ... F03D 11/0008; F03D 1/003; B66C 23/166; F16H 2057/02078; F16H 57/023; F05B 2240/916
USPC ............................................ 29/402.03, 889.1
See application file for complete search history.

(56) References Cited

U.S. PATENT DOCUMENTS

| | | | |
|---|---|---|---|
| 5,897,100 A * | 4/1999 | Napier et al. ................. | 254/8 B |
| 6,459,165 B1 | 10/2002 | Schoo | |
| 6,761,082 B2 | 7/2004 | Hulshof | |
| 8,128,525 B2 | 3/2012 | Dinter et al. | |
| 2009/0324380 A1 | 12/2009 | Pedersen | |

(Continued)

FOREIGN PATENT DOCUMENTS

| | | |
|---|---|---|
| WO | WO 2011/050112 A2 | 4/2011 |
| WO | WO 2013/000469 A1 | 1/2013 |

OTHER PUBLICATIONS

International Search Report and Written Opinion for PCT/US2014/014922 filed Feb. 5, 2014, and mailed from the International Searching Authority on Dec. 1, 2014, 11 pgs.

*Primary Examiner* — Moshe Wilensky
(74) *Attorney, Agent, or Firm* — John R. Thompson; Stoel Rives LLP

(57) ABSTRACT

Tools, systems, and methods for use in conjunction with maintenance, assembly, rebuilding, or other procedures which involve displacing components of an assembly are disclosed. These tools, systems, and methods may be used in conjunction with a crane or other lifting device and may be configured to assemble, disassemble, or otherwise maintain components of an uptower gearbox.

9 Claims, 23 Drawing Sheets

(56) References Cited

U.S. PATENT DOCUMENTS

| | | | |
|---|---|---|---|
| 2010/0111665 A1* | 5/2010 | Daniels | 414/814 |
| 2011/0006543 A1 | 1/2011 | Hu | |
| 2011/0089709 A1 | 4/2011 | Neeper | |
| 2011/0143880 A1 | 6/2011 | Minadeo et al. | |
| 2012/0015776 A1 | 1/2012 | Lemmers, Jr. | |
| 2012/0133147 A1 | 5/2012 | Numajiri | |

* cited by examiner

TOOLS AND METHODS FOR UPTOWER MAINTENANCE

RELATED APPLICATIONS

This application claims priority to U.S. Provisional Application No. 61/783,721 filed on Mar. 14, 2013 and titled "Tools and Methods for Uptower Maintenance," which is hereby incorporated by reference in its entirety.

TECHNICAL FIELD

The present disclosure relates generally to tools, systems, processes, and methods configured for use in conjunction with maintenance, assembly, rebuilding, or other procedures which involve displacing components of an assembly. These tools, systems, and methods may be used in conjunction with a crane or other lifting device.

BRIEF DESCRIPTION OF THE DRAWINGS

The embodiments disclosed herein will become more fully apparent from the following description and appended claims, taken in conjunction with the accompanying drawings. The drawings depict only typical embodiments, which embodiments will be described with additional specificity and detail in connection with the drawings in which:

DETAILED DESCRIPTION

Figure 1B:
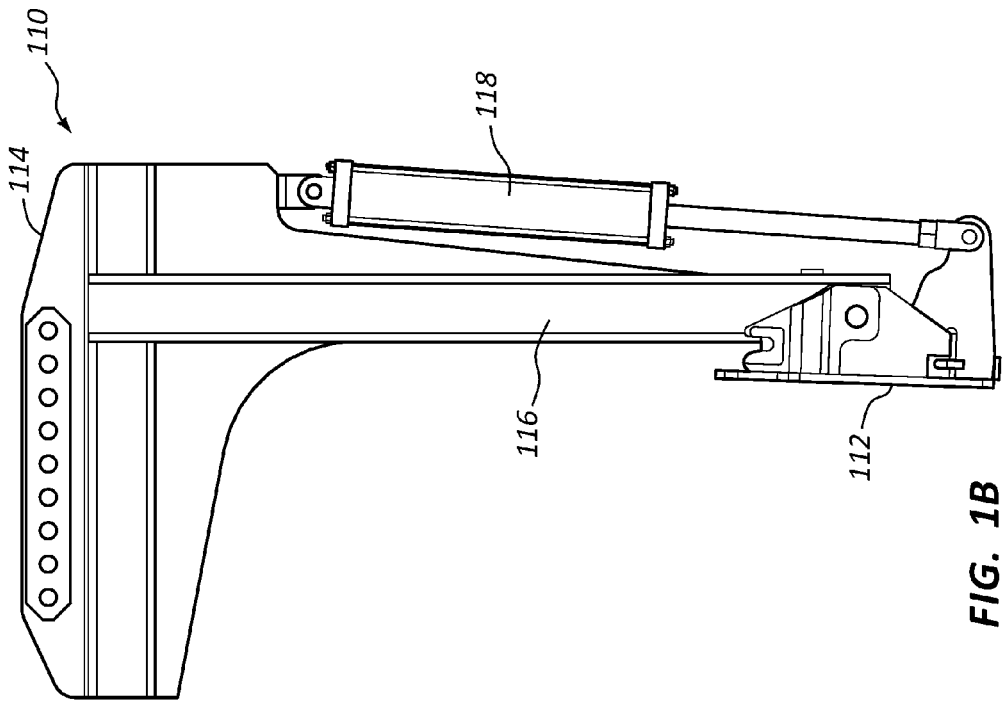
FIG. 1B is a side view of the lifting tool of FIG. 1A.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the disclosure, but is merely representative of various embodiments. While the various aspects of the embodiments are presented in drawings, the drawings are not necessarily drawn to scale unless specifically indicated.

The phrases "connected to" and "coupled to" refer to any form of interaction between two or more entities, including mechanical, electrical, magnetic, electromagnetic, fluid, and thermal interaction. Two components may be coupled to each other even though they are not in direct contact with each other. For example, two components may be coupled to each other through an intermediate component.

Wind turbines may comprise various components and systems disposed at the top of the wind turbine tower. For example, transmissions, gearboxes, generators, oil coolers, and so forth may be disposed within a housing or platform on the wind turbine tower. As used herein, "uptower" refers to the position of such components on a turbine tower, when the tower is erect. In other words, "uptower" maintenance refers to processes or methods of maintaining systems or components disposed uptower. For example, a crane or other lifting device may be utilized to manipulate components uptower. In some embodiments the systems, tools, and methods disclosed below may be used in conjunction with the uptower rebuilding or maintenance of a gearbox or other turbine components. Uptower gearbox maintenance refers to processes wherein certain components of a gearbox may be disassembled and removed from the tower without displacing the entire gearbox from the tower at once.

In some embodiments, removing an entire gearbox of similar components from a wind turbine tower may require the use of a large crane or other lifting device, in order to displace the entire assembly at once. Methods and systems configured to displace separate components of a gearbox may allow use of smaller cranes. Such systems may thus reduce the expense of a maintenance operation.

Though specific examples herein may refer to wind turbines, the present disclosure is applicable to maintenance, rebuilding, or disassembly of gearboxes or related components in other applications as well. For example, the disclosed methods may be applicable to maintenance of similar components in various difficult-to-access positions or applications, in addition to uptower wind turbine applications.

FIGS. 1A-6C, discussed below, illustrate various tools and components which may be used in conjunction with uptower maintenance. FIGS. 7-18 illustrate an exemplary maintenance procedure, which may utilize one or more of the components illustrated in FIGS. 1A-6C. Various procedures are within the scope of the disclosure. The procedure described below is exemplary only; various procedures within the scope of this disclosure may incorporate only portions of the exemplary procedure and may comprise additional steps. Additionally, not every procedure within the scope of the disclosure will necessarily utilize every component or tool shown or described below.

Figure 1A:
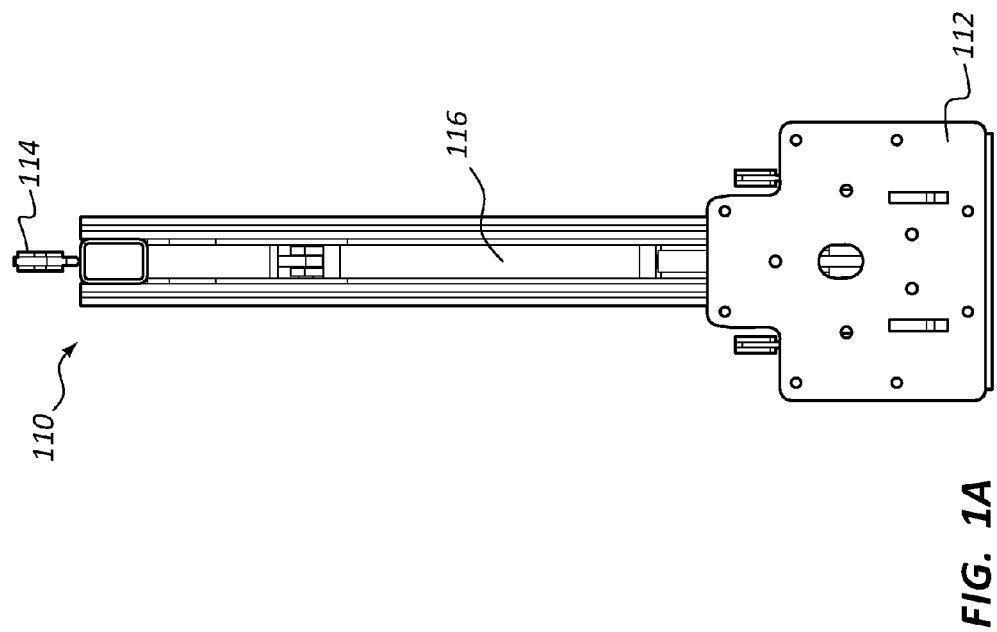
FIG. 1A is a front view of a lifting tool.
Figure 1D:
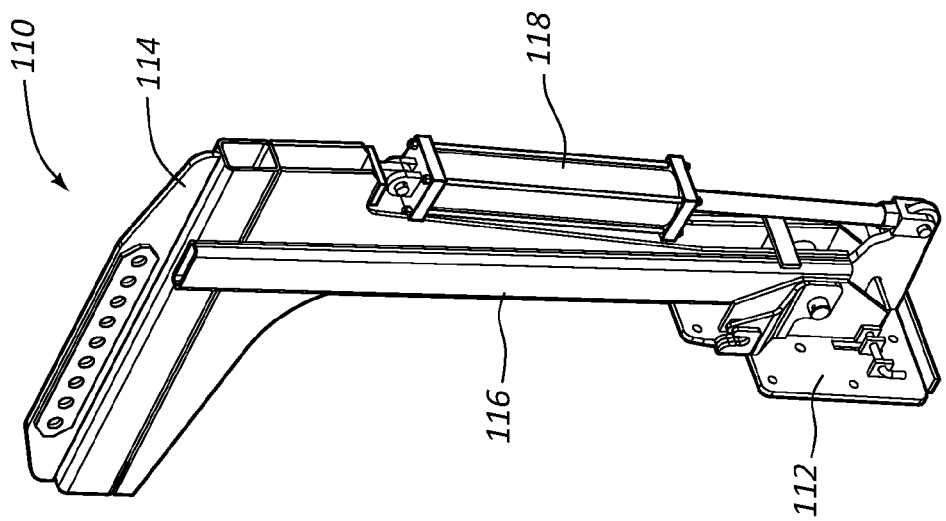
FIG. 1D is a second perspective view of the lifting tool of FIG. 1A.
Figure 1C:
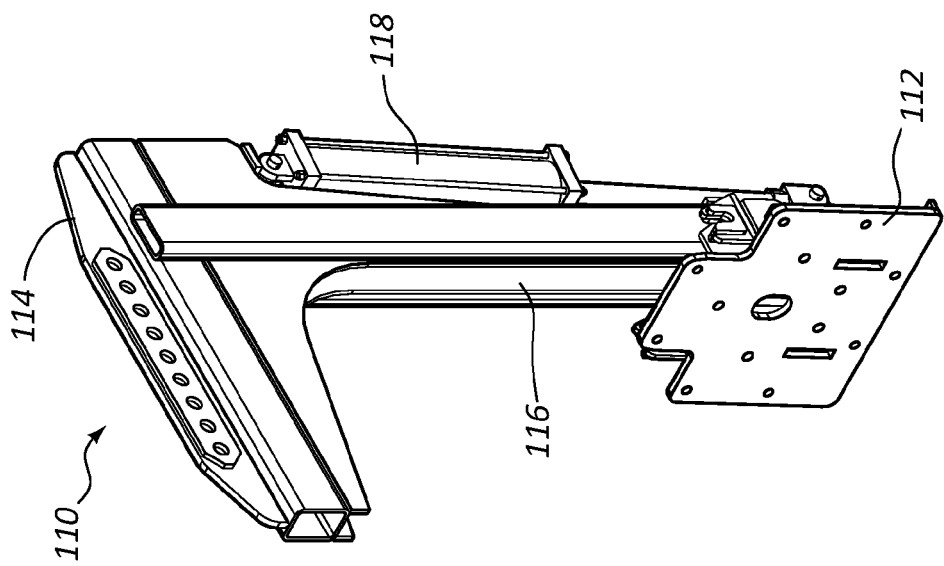
FIG. 1C is a perspective view of the lifting tool of FIG. 1A.

FIGS. 1A-1D illustrate a lifting tool 110: FIG. 1A is a front view of the lifting tool 110; FIG. 1B is a side view of the lifting tool 110; FIG. 1C is a perspective view of the lifting tool 110; and FIG. 1D is a second perspective view of the lifting tool 110.

The lifting tool 110 may be configured to couple one or more components of an assembly or system to a lifting device, such as a crane. For example, the lifting tool 110 may comprise a first portion 114 and a second portion 116. The first 114 and second 116 portions may be portions of one integrally formed member, or partially or wholly comprise separate components coupled together (for example, by welding). In the illustrated embodiment, the first portion 114 may be configured to extend generally horizontally when the lifting tool 110 is in use. The lifting tool 110 may be configured to be coupled to a crane cable or other lifting device. For example, the first portion 114 may comprise holes or other attachment points configured to couple to a crane cable. The second portion 116 may extend away from the first portion 114, offsetting an end of the second portion 116 from the attachment points. In the illustrated embodiment, the second portion 116 is configured to extend generally vertically when the lifting tool 110 is in use.

The first 114 and second 116 portions may further be configured to balance a load applied to the lifting tool 110 and/or to orient the lifting tool 110 in a particular direction when coupled to a lifting device. Lifting tools comprising a variety of shapes, including embodiments wherein the first and second portions are generally aligned vertically and in U-shaped designs, squares, frames, and so forth, are within the scope of this disclosure.

The lifting tool 110 may comprise a coupling member 112 configured to couple the lifting tool 110 to a component of a gearbox assembly, a related component, an adaptor, or so forth. In some embodiments, the coupling member 112 may be coupled to the second portion 116 such that the coupling member 112 can rotate or otherwise move with respect to the second portion 116. For example, in the illustrated embodiment, the coupling member 112 is pinned to the second portion 116 such that the coupling member 112 may rotate with respect to the second portion 116. A hydraulic ram 118 may be operatively coupled to the first 114 or second 116 portion and to the coupling member 112 to control relative rotation of the coupling member 112.

Rotation of the coupling member 112 with respect to the first 114 or second 116 portion may facilitate alignment of the coupling member 112 with other components. For example, during use, it may be difficult to manipulate the position of the lifting tool 110 to align it with another component, using just the crane cable. Manipulation of the position of the coupling member 112 (for example, by manipulating the hydraulic ram 118), either separate from or in conjunction with manipulation of the entire lifting tool 110, may facilitate orientation of the coupling member 112 with another part or component.

The coupling member 112 may be configured to couple the lifting tool 110 directly to a component of a system to be maintained (such as a component of a gearbox) and/or may be configured to couple the lifting tool 110 to an adaptor which, in turn, couples to such a component.

Figure 2C:
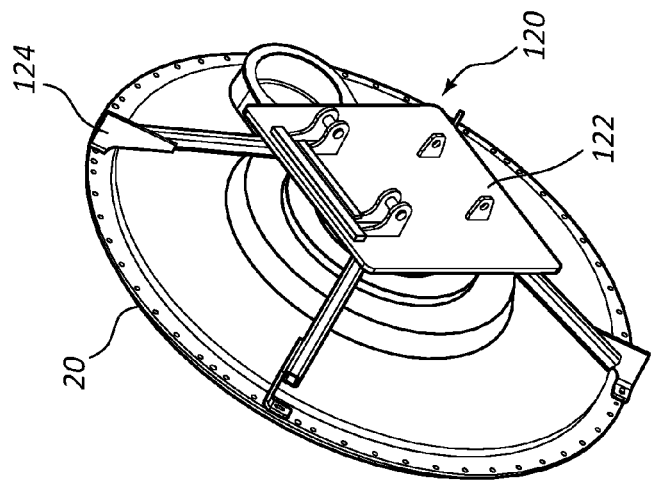
FIG. 2C is a perspective view of the plate adaptor of FIG. 2A coupled to a plate.
Figure 2B:
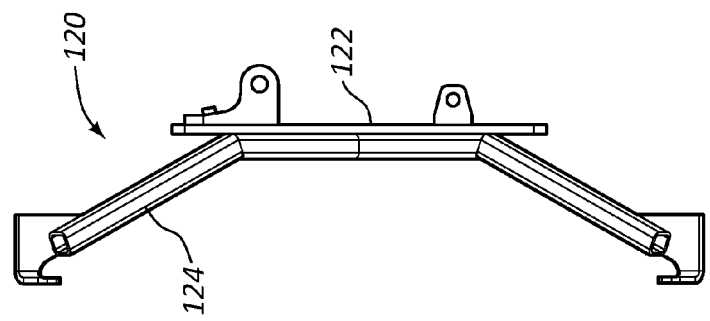
FIG. 2B is a side view of the plate adaptor of FIG. 2A.
Figure 2A:
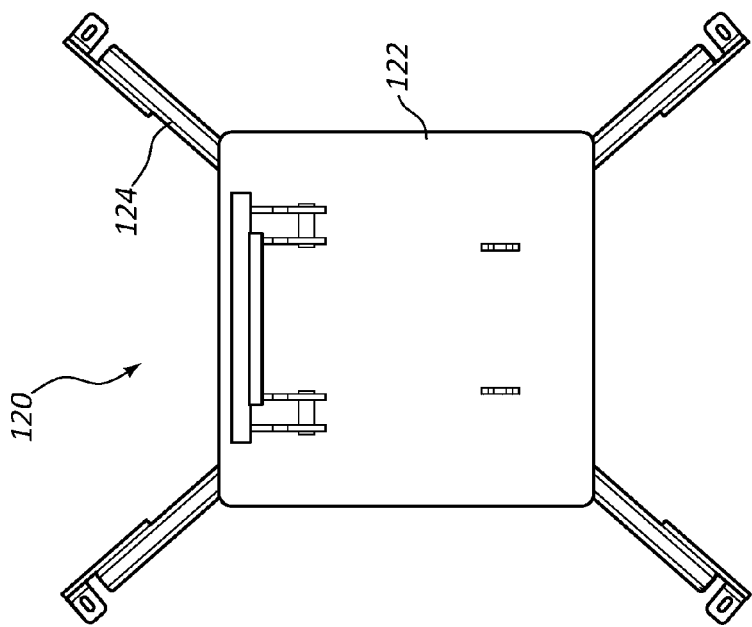
FIG. 2A is a front view of a plate adaptor.

FIGS. 2A-2C illustrate a plate adaptor 120, which may be configured for use in conjunction with the lifting tool 110 of FIGS. 1A-1D. FIG. 2A is a front view of the plate adaptor 120; FIG. 2B is a side view of the plate adaptor 120; and FIG. 2C is a perspective view of the plate adaptor 120 coupled to a plate 20. Adaptors such as the plate adaptor 120 may be configured to facilitate coupling of the lifting tool (110 of FIG. 1A) to another component, such as the plate 20. A variety of adaptors may each be configured to couple to the same lifting tool (110 of FIG. 1A), while each adaptor is designed to couple to one or more specific components of an assembly. This may facilitate exchange of components during a process, as a common lifting tool (110 of FIG. 1A) may be adapted to couple to a wide variety of parts.

The plate adaptor 120 of FIGS. 2A-2C may comprise arms 124 configured to engage a plate 20. The arms 124 may be sized or otherwise designed for a specific plate 20 of a system or may be adjustable to fit a variety of similarly sized or shaped components. FIG. 2C illustrates an example of the plate adaptor 120 being coupled to a plate 20. The plate adaptor may further comprise a coupling portion 122 configured to mate with the coupling member (112 of FIG. 1A) of the lifting tool (110 of FIG. 1A).

Figure 3B:
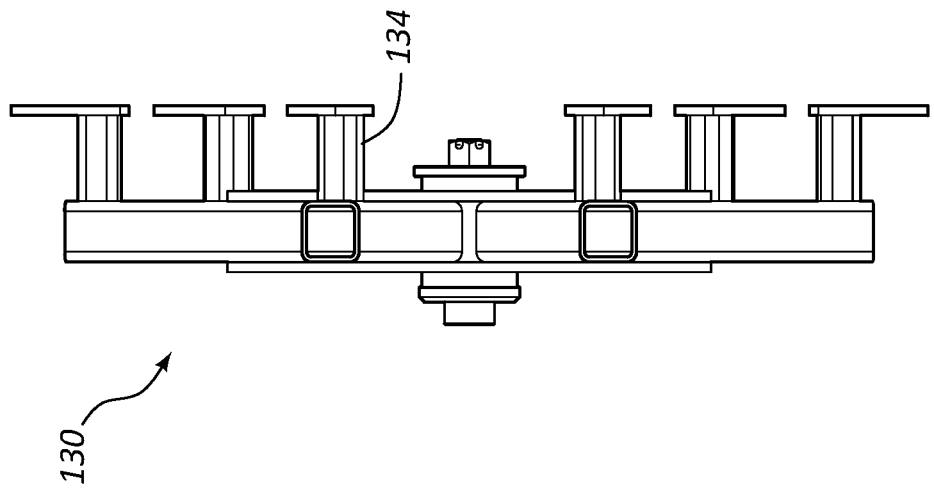
FIG. 3B is a side view of the portion of the planet carrier adaptor of FIG. 3A.
Figure 3A:
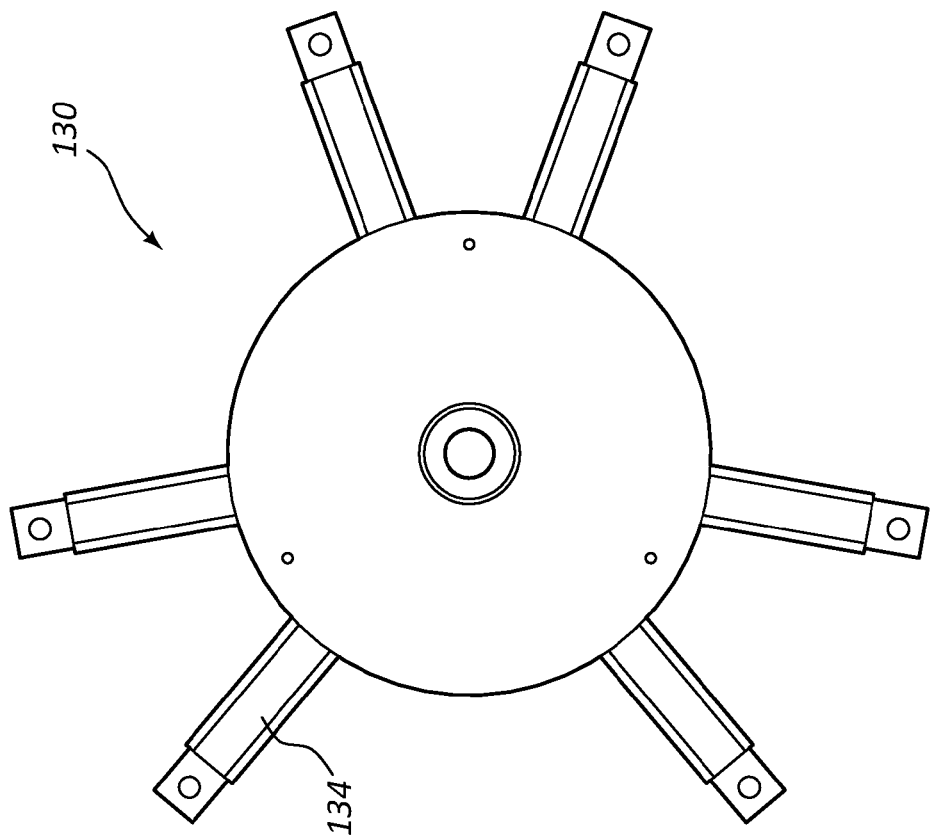
FIG. 3A is a front view of a portion of a planet carrier adaptor.
Figure 3D:
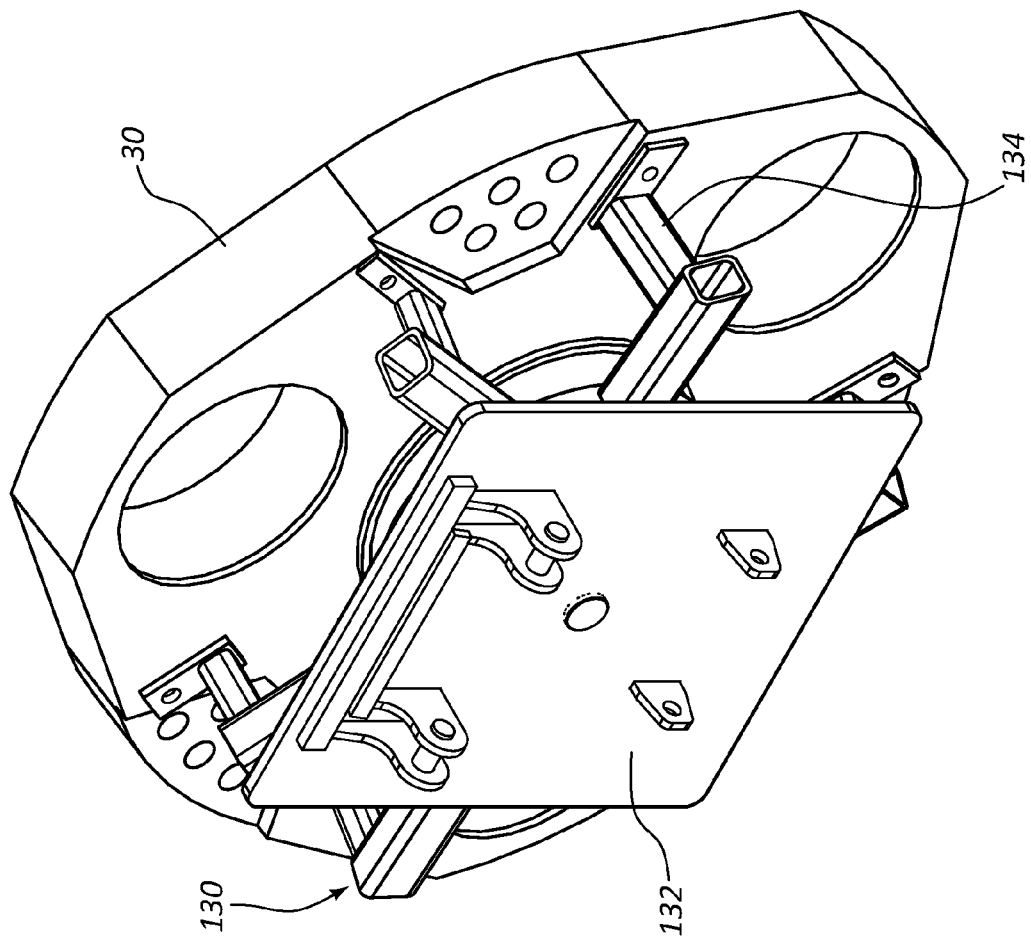
FIG. 3D is a perspective view of the planet carrier adaptor of FIG. 3A, including a coupling member, and a planet carrier.
Figure 3C:
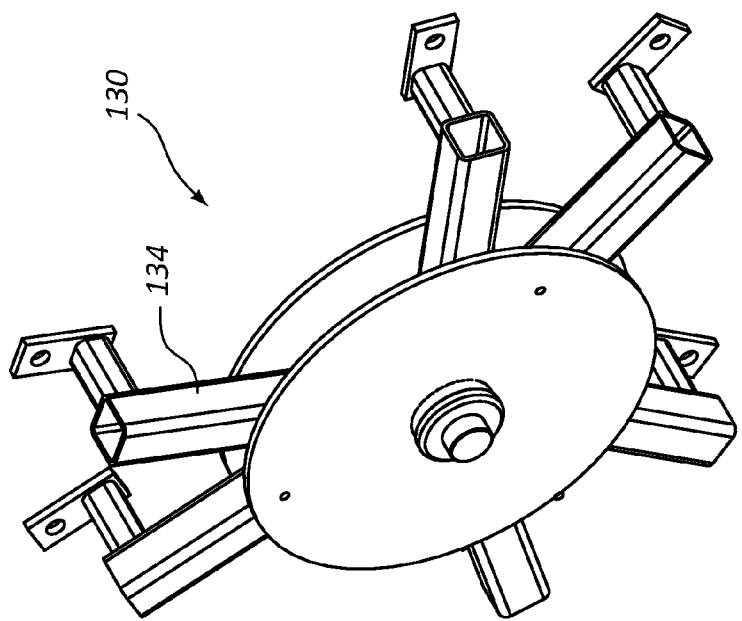
FIG. 3C is a perspective view of the portion of the planet carrier adaptor of FIG. 3A.

FIGS. 3A-3D illustrate a planet carrier adaptor, which may be an output planetary carrier adaptor 130, which may be configured for use in conjunction with the lifting tool 110 of FIGS. 1A-1D. FIG. 3A is a front view of a portion of the output planetary carrier adaptor 130; FIG. 3B is a side view of the portion of the output planetary carrier adaptor 130; FIG. 3C is a perspective view of the portion of the output planetary carrier adaptor 130; and FIG. 3D is a perspective view of the planet carrier adaptor 130, including a coupling portion 132, coupled to an output planetary carrier 30.

The output planetary carrier adaptor 130 may comprise arms 134 configured to interact with an output planetary carrier 30 to couple the output planetary carrier 30 to the output planetary carrier adaptor 130. The coupling portion 132 of the output planetary carrier adaptor 130 may be configured to mate with the coupling member (112 of FIG. 1A) of the lifting tool (110 of FIG. 1A). The planetary carrier adaptor, like other components, may be tailored to complement the design of various transmissions. For example, a circular planetary carrier adaptor may be modified so that the perimeter of the planetary carrier forms an irregular shape to complement the structure and design of a particular transmission.

Figure 4B:
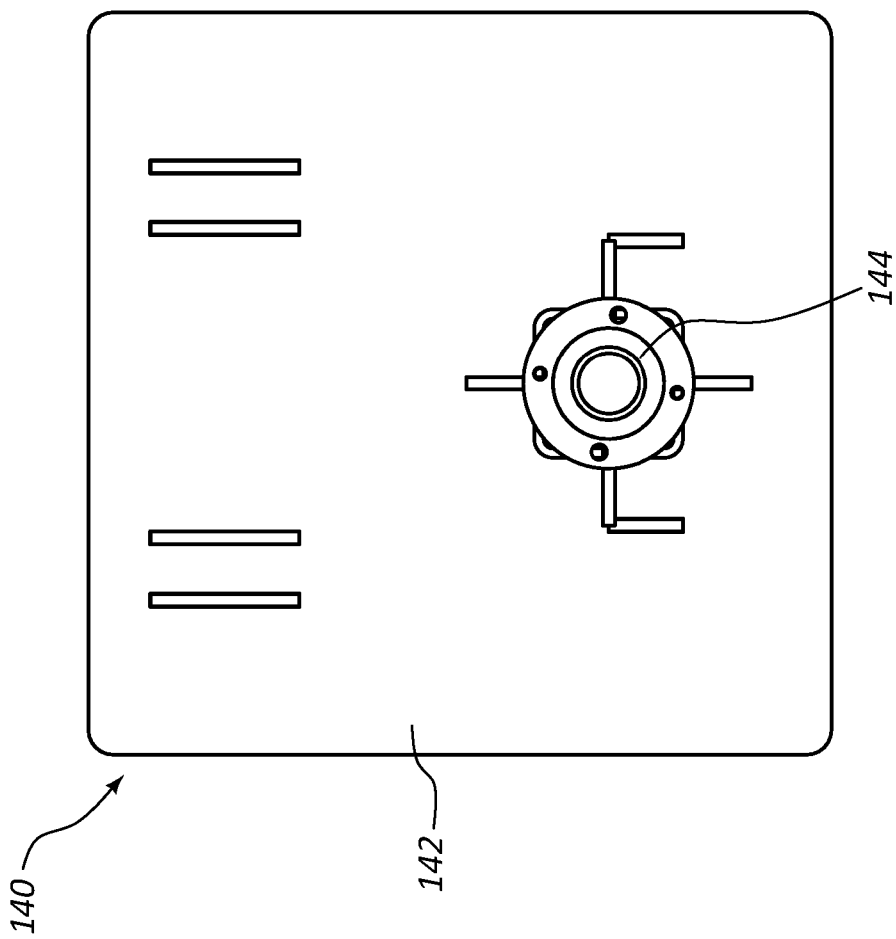
FIG. 4B is a front view of the planet gear adaptor of FIG. 4A.
Figure 4A:
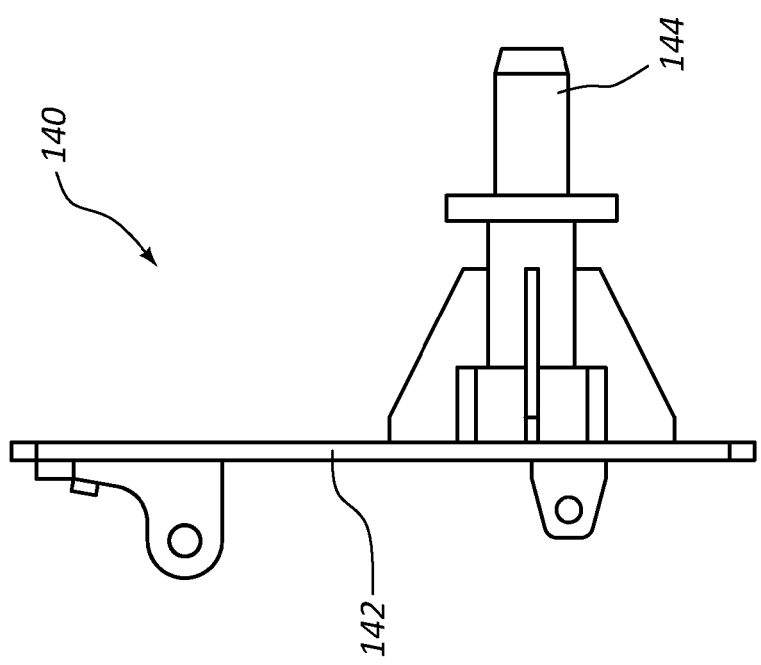
FIG. 4A is a side view of a planet gear adaptor.
Figure 4D:
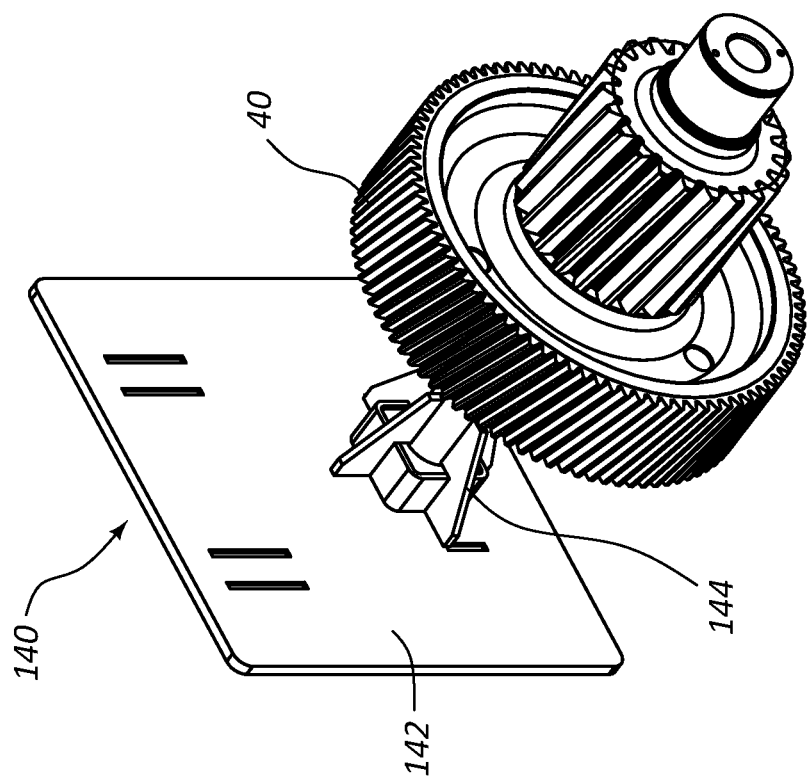
FIG. 4D is a second perspective view of the planet gear adaptor and planet gear of FIG. 4C.
Figure 4C:
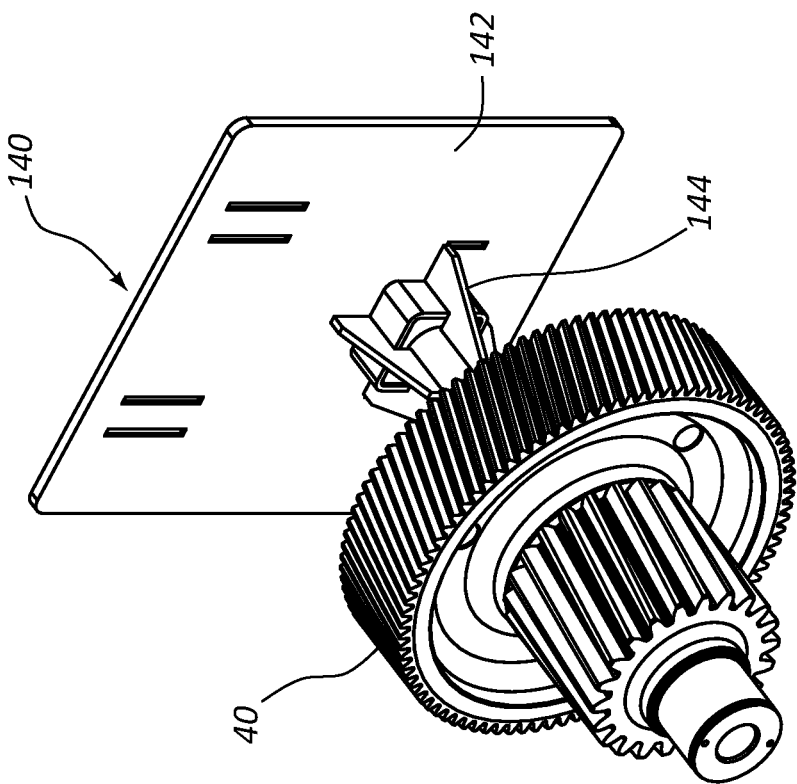
FIG. 4C is a perspective view of the planet gear adaptor of FIG. 4A and a planet gear.

FIGS. 4A-4D illustrate a planet gear adaptor 140, which may be configured for use in conjunction with the lifting tool 110 of FIGS. 1A-1D. FIG. 4A is a side view of the planet gear adaptor 140; FIG. 4B is a front view of the planet gear adaptor 140; FIG. 4C is a perspective view of the planet gear adaptor 140 coupled to a planet gear 40; and FIG. 4D is a second perspective view of the planet gear adaptor 140 coupled to the planet gear 40. The planet gear adaptor 140 may comprise a coupling portion 142 configured to mate with the coupling member (112 of FIG. 1A) of the lifting tool (110 of FIG. 1A). The planet gear adaptor 140 may also comprise a gear interface extension 144 configured to couple the planet gear adaptor 140 to a planet gear 40 of an assembly. The gear interface extension 144 may be configured to interact with any surface of a gear, including one or more teeth of the gear.

Figure 5B:
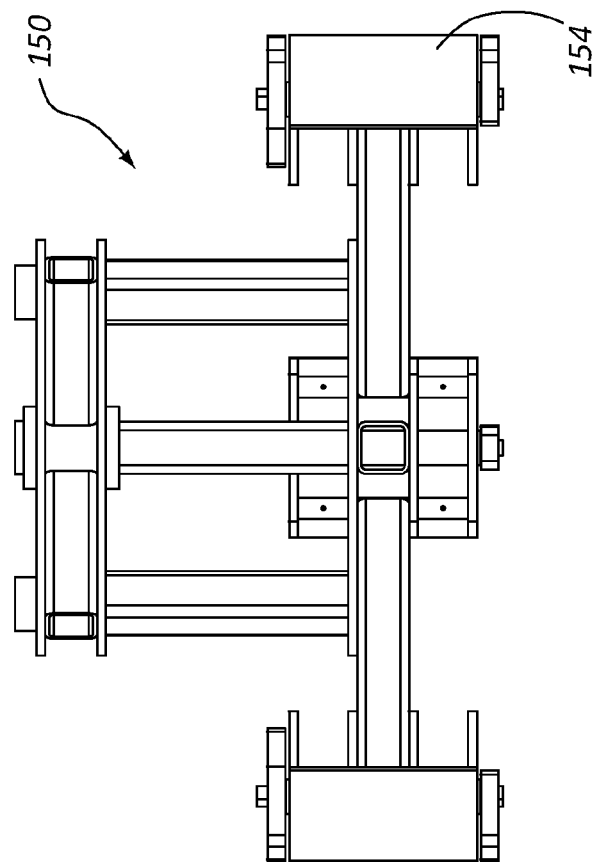
FIG. 5B is a top view of the portion of the ring gear adaptor of FIG. 5A.
Figure 5A:
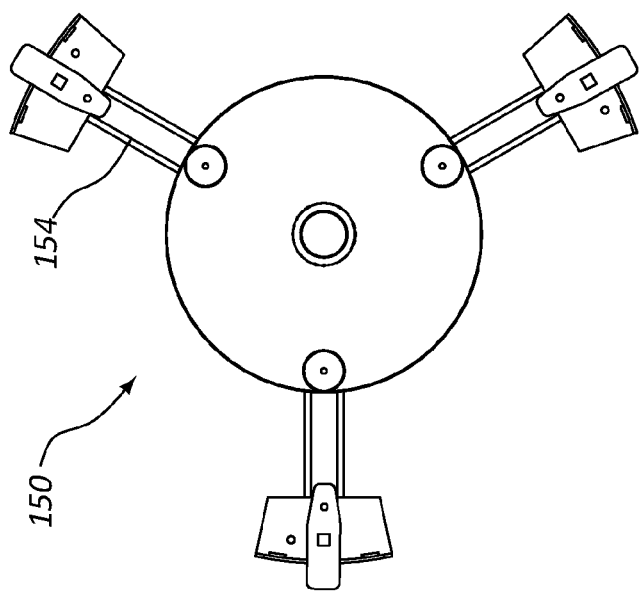
FIG. 5A is a front view of a portion of a ring gear adaptor.
Figure 5D:
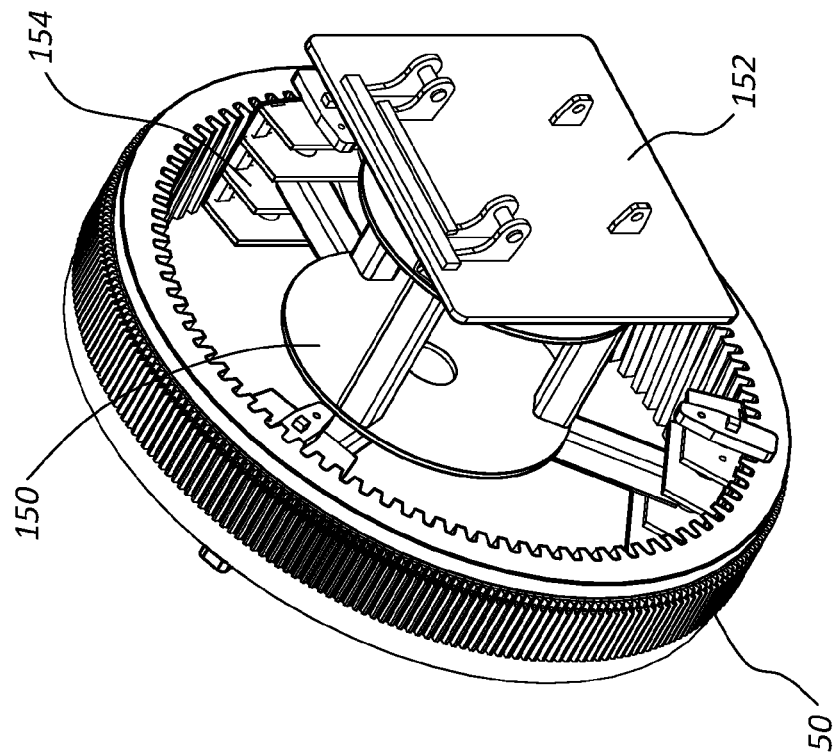
FIG. 5D is a perspective view of the ring gear adaptor of FIG. 5A, including a coupling member, and a ring gear.
Figure 5C:
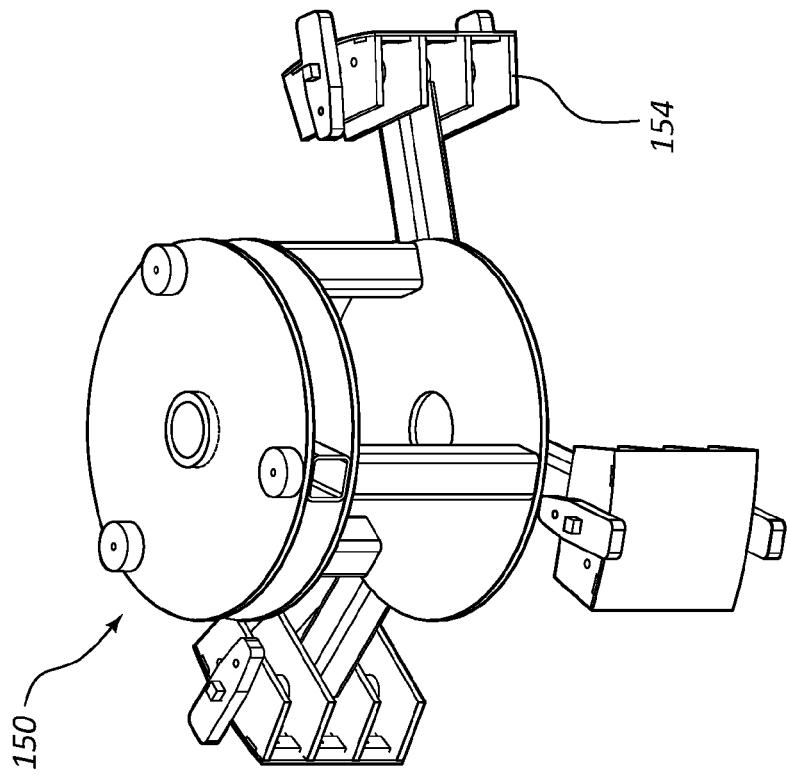
FIG. 5C is a perspective view of the portion of the ring gear adaptor of FIG. 5A.

FIGS. 5A-5D illustrate a ring gear adaptor 150, which may be configured for use in conjunction with the lifting tool 110 of FIGS. 1A-1D. FIG. 5A is a front view of a portion of the ring gear adaptor 150; FIG. 5B is a top view of the portion of the ring gear adaptor 150; FIG. 5C is a perspective view of the portion of the ring gear adaptor 150; and FIG. 5D is a perspective view of the ring gear adaptor 150, including a coupling member 152, coupled to a ring gear 50.

The ring gear adaptor 150 may comprise a coupling portion 152 configured to mate with the coupling member (112 of FIG. 1A) of the lifting tool (110 of FIG. 1A). The ring gear adaptor 150 may further comprise arms 154 configured to mate with, and/or otherwise couple the ring gear adaptor 150 to, a ring gear 50. In some embodiments, the arms 154 may interact with the teeth of the ring gear 50 and/or may be directly coupled to the ring gear 50 with a fastener such as a bolt.

Figure 6C:
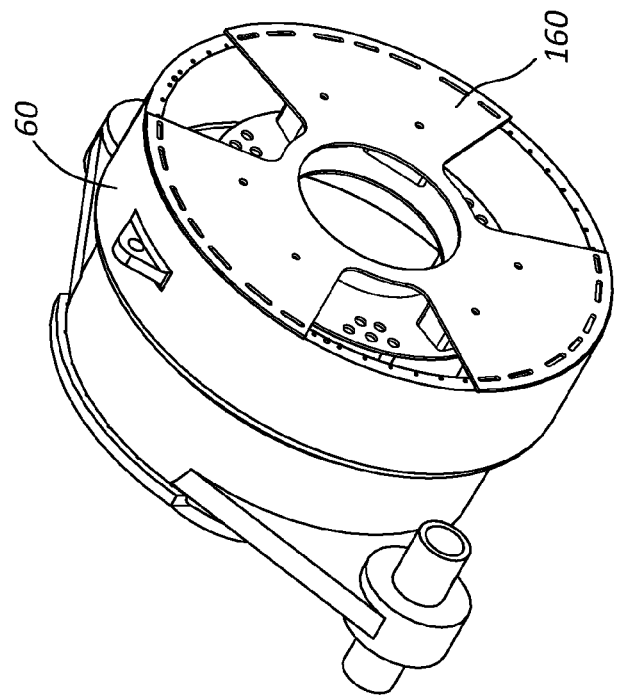
FIG. 6C is a perspective view of the rotor lock of FIG. 6A disposed in an input housing.
Figure 6B:
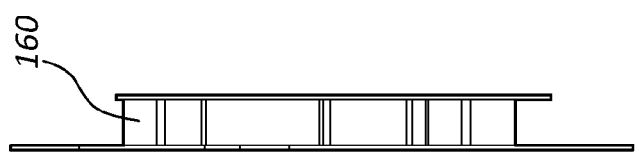
FIG. 6B is a side view of the rotor lock of FIG. 6A.
Figure 6A:
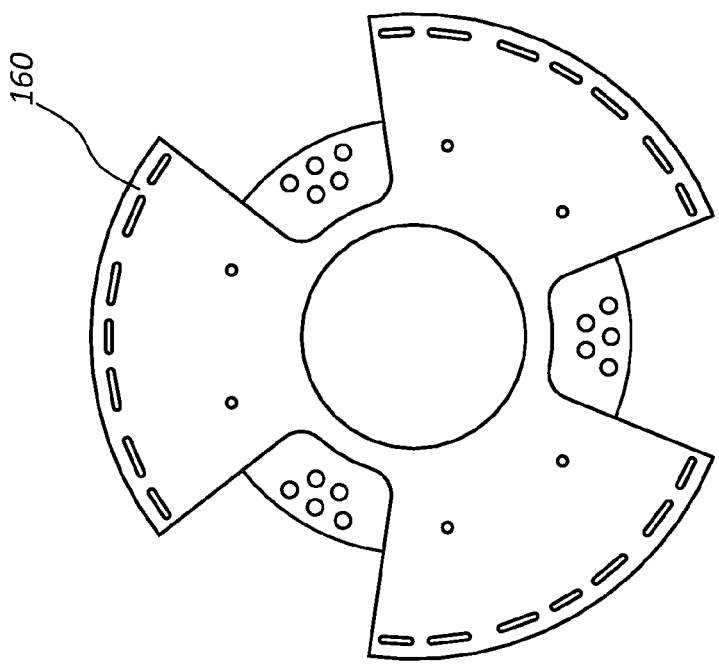
FIG. 6A is a front view of a rotor lock.

FIGS. 6A-6C illustrate a rotor lock 160 which may be used in conjunction with some maintenance processes. FIG. 6A is a front view of the rotor lock 160; FIG. 6B is a side view of the rotor lock 160; and FIG. 6C is a perspective view of the rotor lock 160 disposed in an input housing 60. The rotor lock 160 may be coupled to the lifting tool (110 of FIG. 1A) or other components, as further described below.

The lifting tool 110 or any of the adaptors or other components referenced in FIGS. 1A-6C may be used in a variety of procedures. The lifting tool 110 may be used to couple a variety of components to a lifting device (such as a crane) to assemble or disassemble portions of a gearbox or related components. The gearbox and related components may be disposed uptower during such maintenance, with only certain components (such as those removed during disassembly) taken down from the tower. The lifting tool 110 and/or any of the adaptors or other components may be coupled to each other or other components in a variety of ways. In some instances these components may be coupled by fasteners such as bolts.

FIGS. 7-18 are perspective views of a wind turbine gearbox 1 and related components. The exemplary procedure described below may be used to rebuild a General Electric Transportation gearbox while the gearbox is disposed uptower. Analogous procedures may be used to rebuild or maintain various other gearboxes, including other gearboxes comprising planetary gears. Further, though particular tools referenced herein may be described as adaptors for particular components (e.g., a mid-plate adaptor) it is within the scope of this disclosure to analogously apply such disclosure to various analogous components (e.g., an adaptor configured for use with any plate of an assembly).

In the Figures discussed below, the translucent shell around the gearbox 1 represents an outer housing, or nacelle, of a wind turbine assembly; the entire outer housing may be disposed uptower during the exemplary process outlined below. The outer housing may be partially removed (for example, the top may be removed by a crane) to facilitate access to the gearbox 1 and related components.

Figure 7:
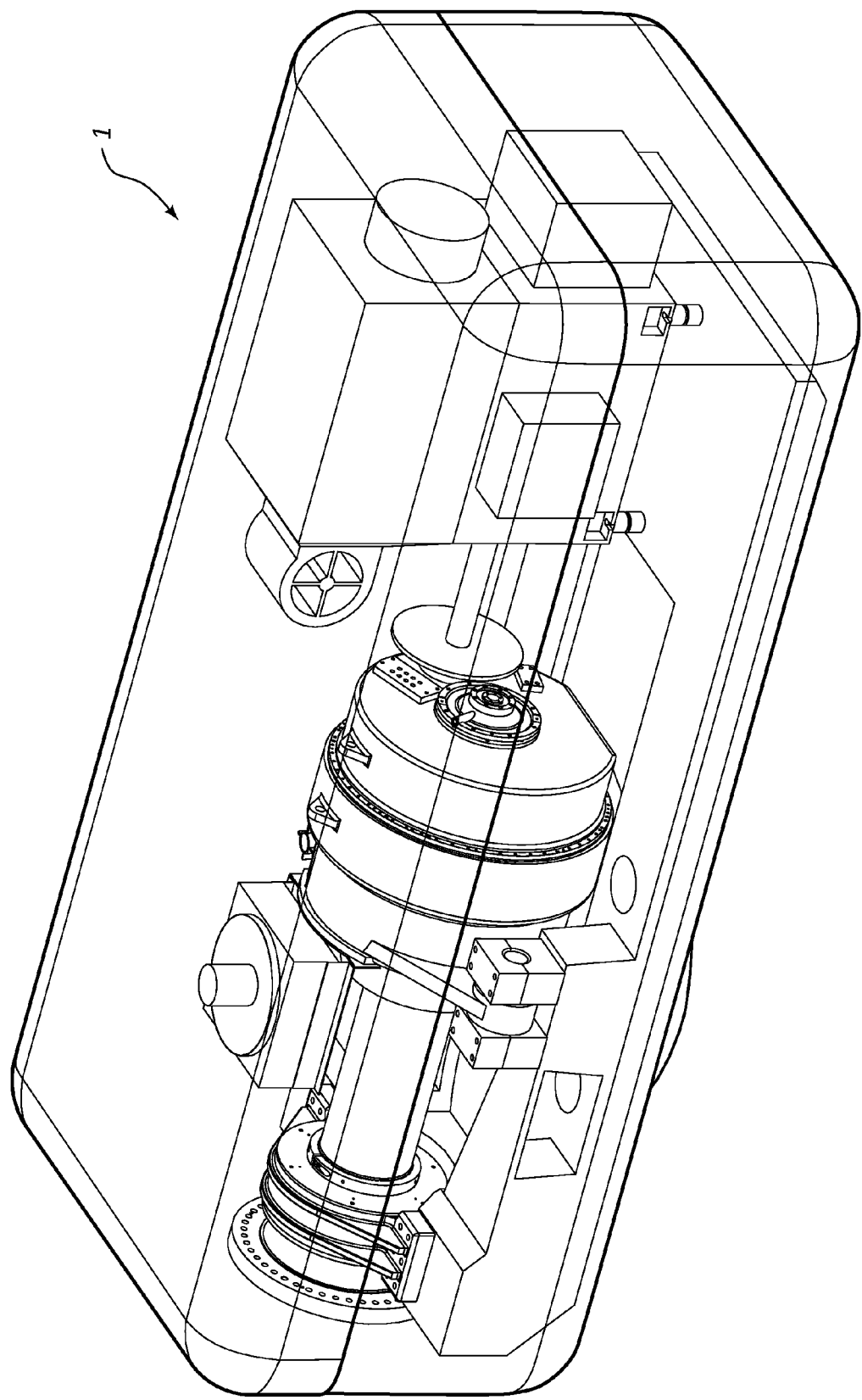
FIG. 7 is a perspective view of an assembled gearbox and related components.

FIG. 7 is a perspective view of an assembled gearbox 1 and related components. In one exemplary process, the gearbox 1 and related components may be disposed uptower and rebuilt or disassembled as described below. The bulk of the assembly may remain uptower during the process, with only the components which are removed brought down.

Figure 8:
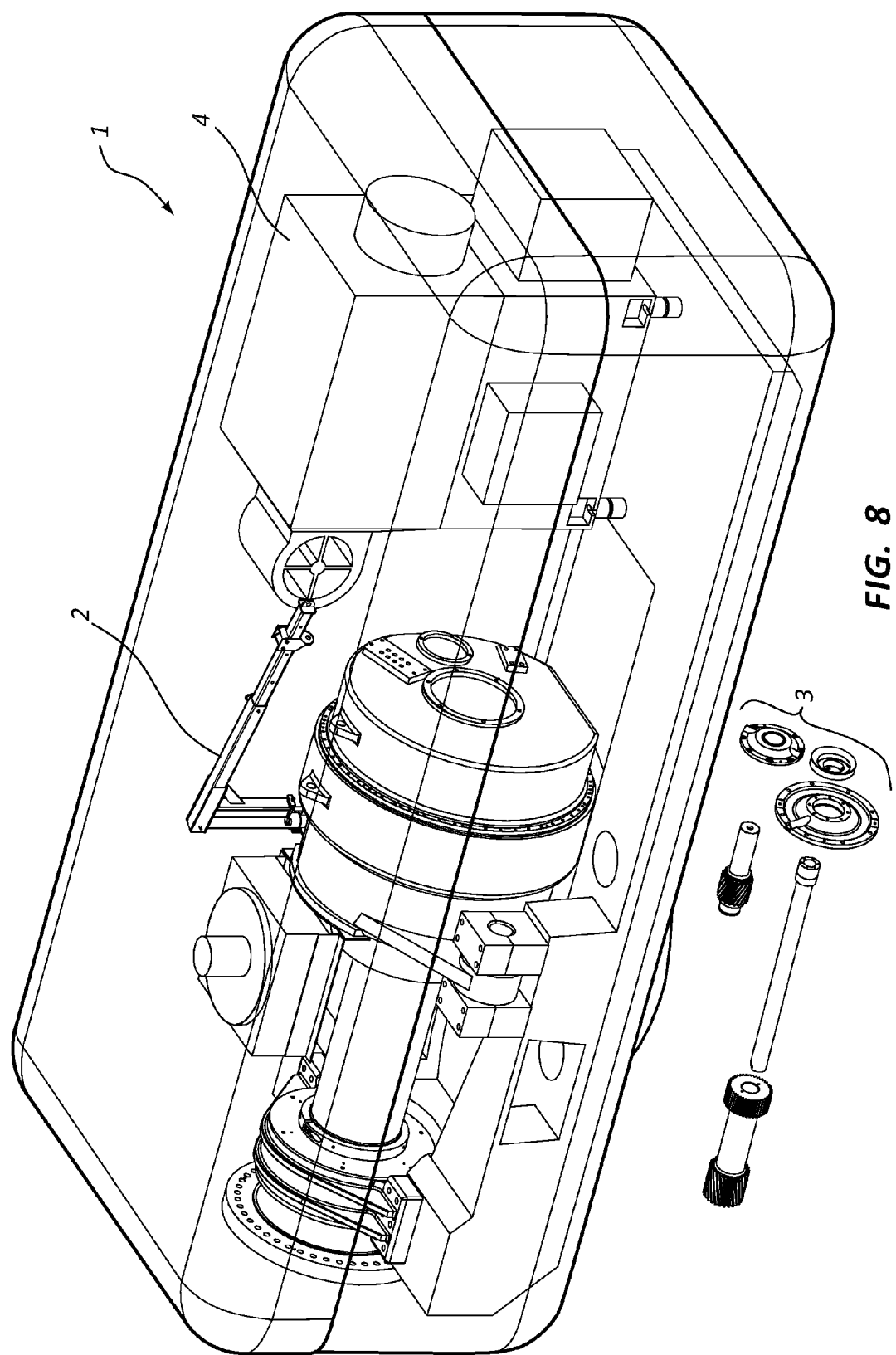
FIG. 8 is a perspective view of the gearbox of FIG. 7 with ancillary components removed and a jib crane installed.

FIG. 8 is a perspective view of the gearbox 1 with various ancillary components 3 removed from the assembly. The ancillary components 3 may comprise elements such as pinion gears, slip tube sun pinions, covers, and so on. Further, in the embodiment of FIG. 8, a jib crane 2 is installed uptower. The jib crane 2 may be hoisted uptower using a lifting device such as a larger crane. The ancillary components 3 may be brought down from the tower using the lifting device.

Figure 9:
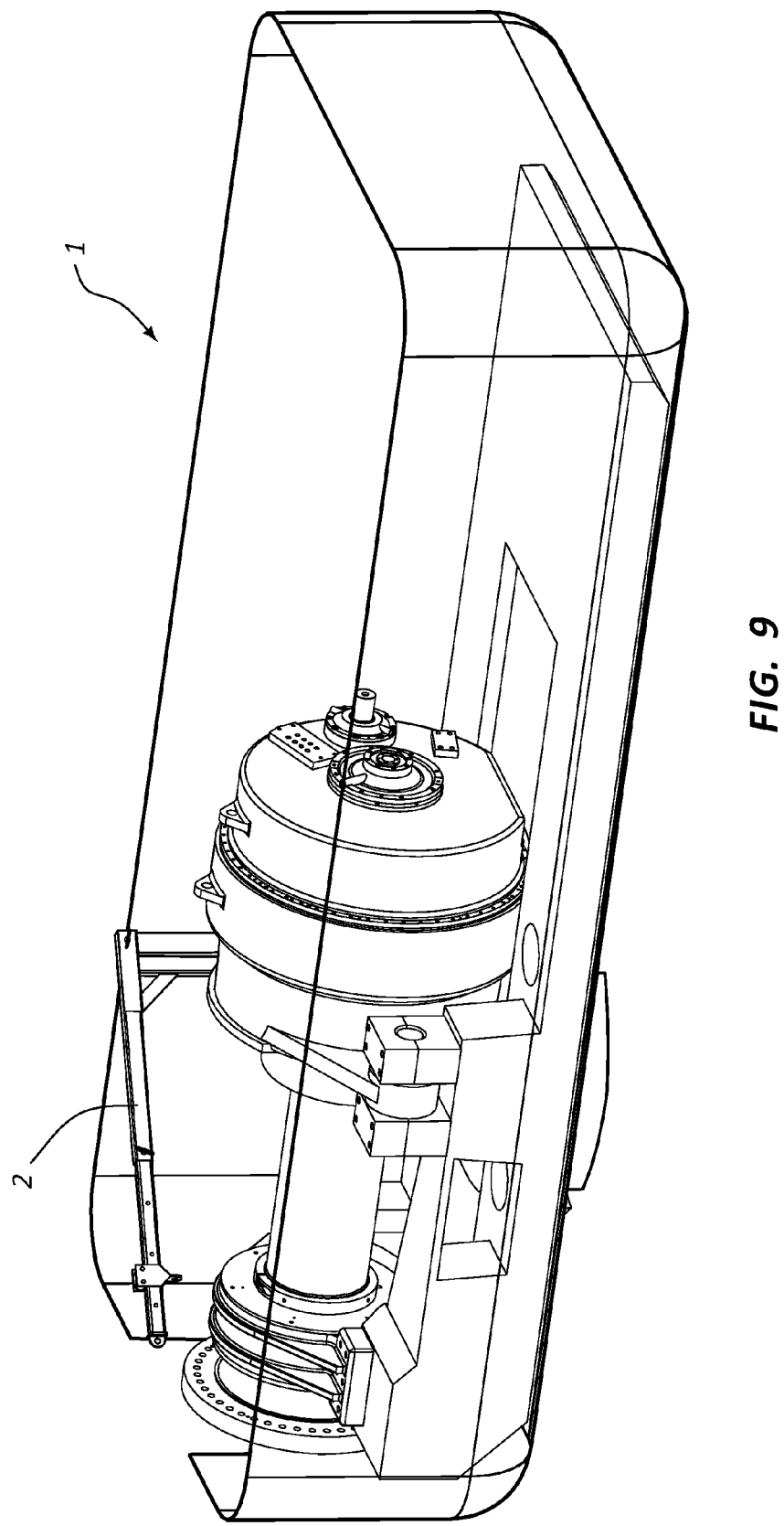
FIG. 9 is a perspective view of the gearbox of FIG. 7 with the related generator and oil cooler removed.

FIG. 9 is a perspective view of the gearbox 1 with the related generator and oil cooler (4 of FIG. 8) removed. The generator and oil cooler (4 of FIG. 8) may be brought down the tower using the crane.

Figure 10:
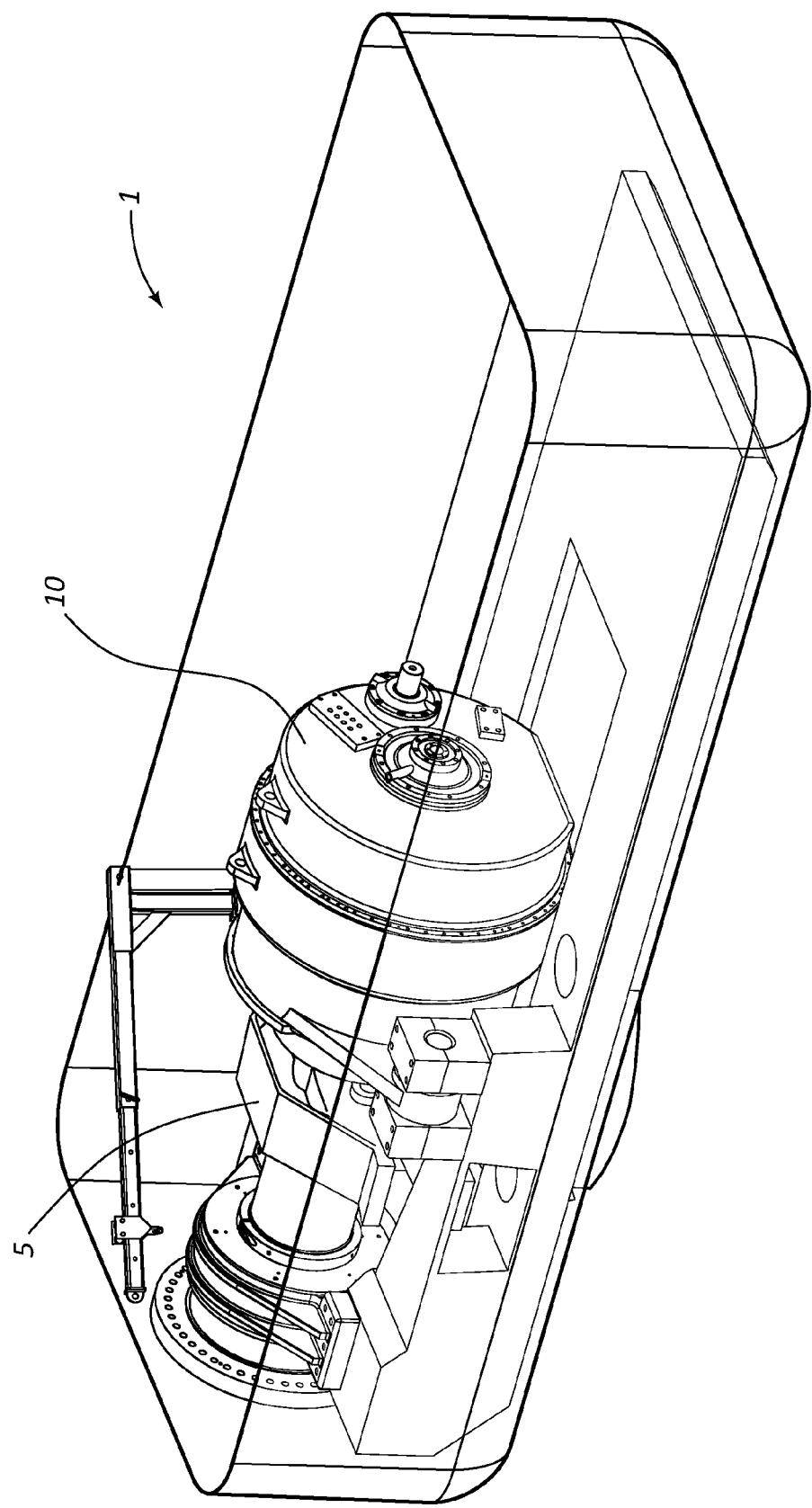
FIG. 10 is a perspective view of the gearbox of FIG. 7 with a mainshaft support installed.

As shown in FIG. 10, a perspective view of the gearbox 1, a mainshaft support 5 may then be installed. The mainshaft support 5 may be configured to resist rotation of a shaft or other components of the gearbox 1 during maintenance. The mainshaft support 5 may be hoisted uptower using the crane.

Figure 11:
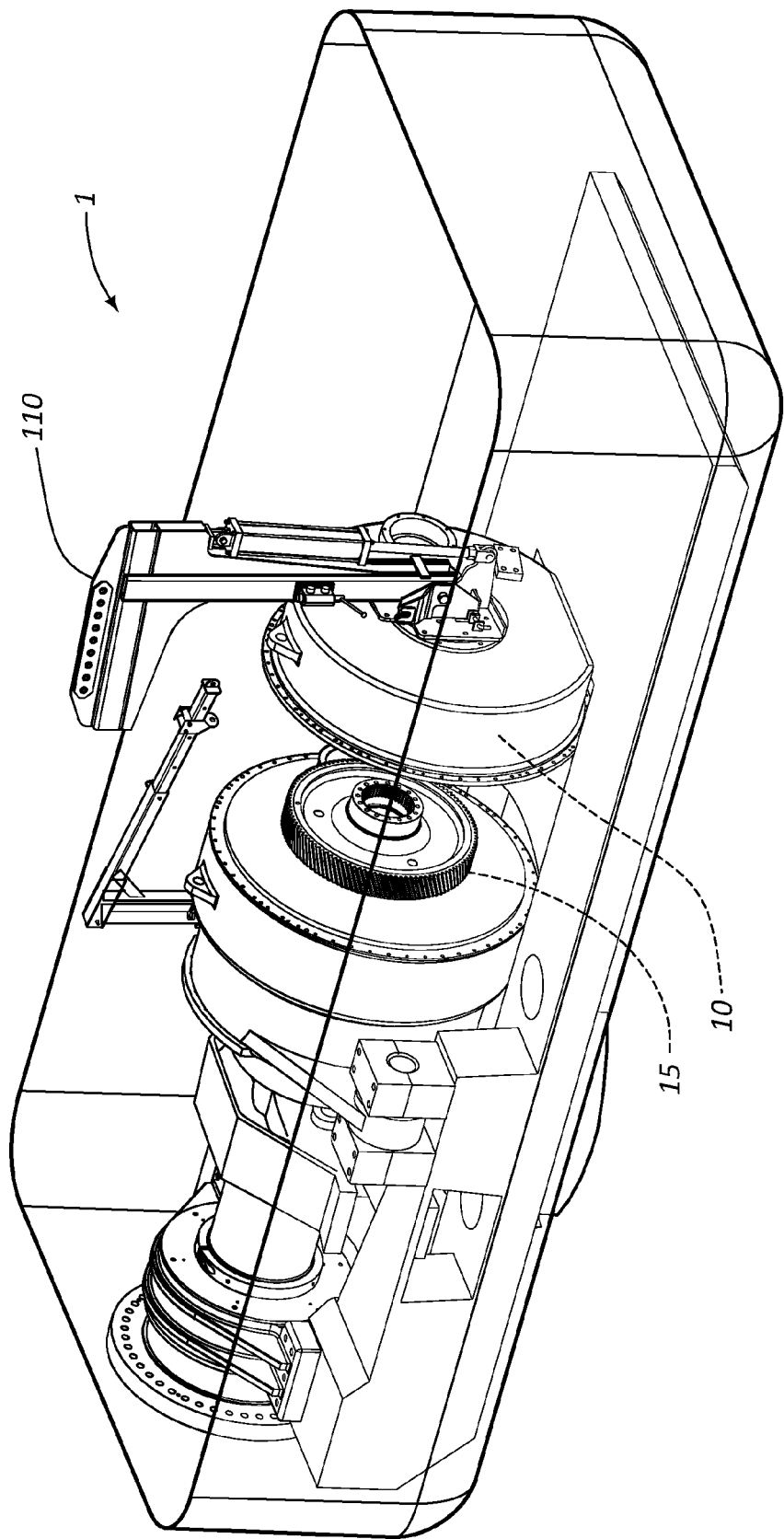
FIG. 11 is a perspective view of the gearbox of FIG. 7, shown with a lifting tool removing an output housing.

In some embodiments, a front housing 10 of the gearbox 1 may then be removed. FIG. 11 is a perspective view of the gearbox 1, shown with the lifting tool 110 (also described above) coupled to a front housing, the output housing 10. The lifting tool 110 may also be coupled to the crane (or other lifting device) though a crane cable is not shown in this or subsequent views. The lifting tool 110 may be configured to couple directly to the output housing 10 without the use of an adaptor. Removal of the output housing 10 may expose a high speed gear 15 disposed under the output housing 10.

Figure 12:
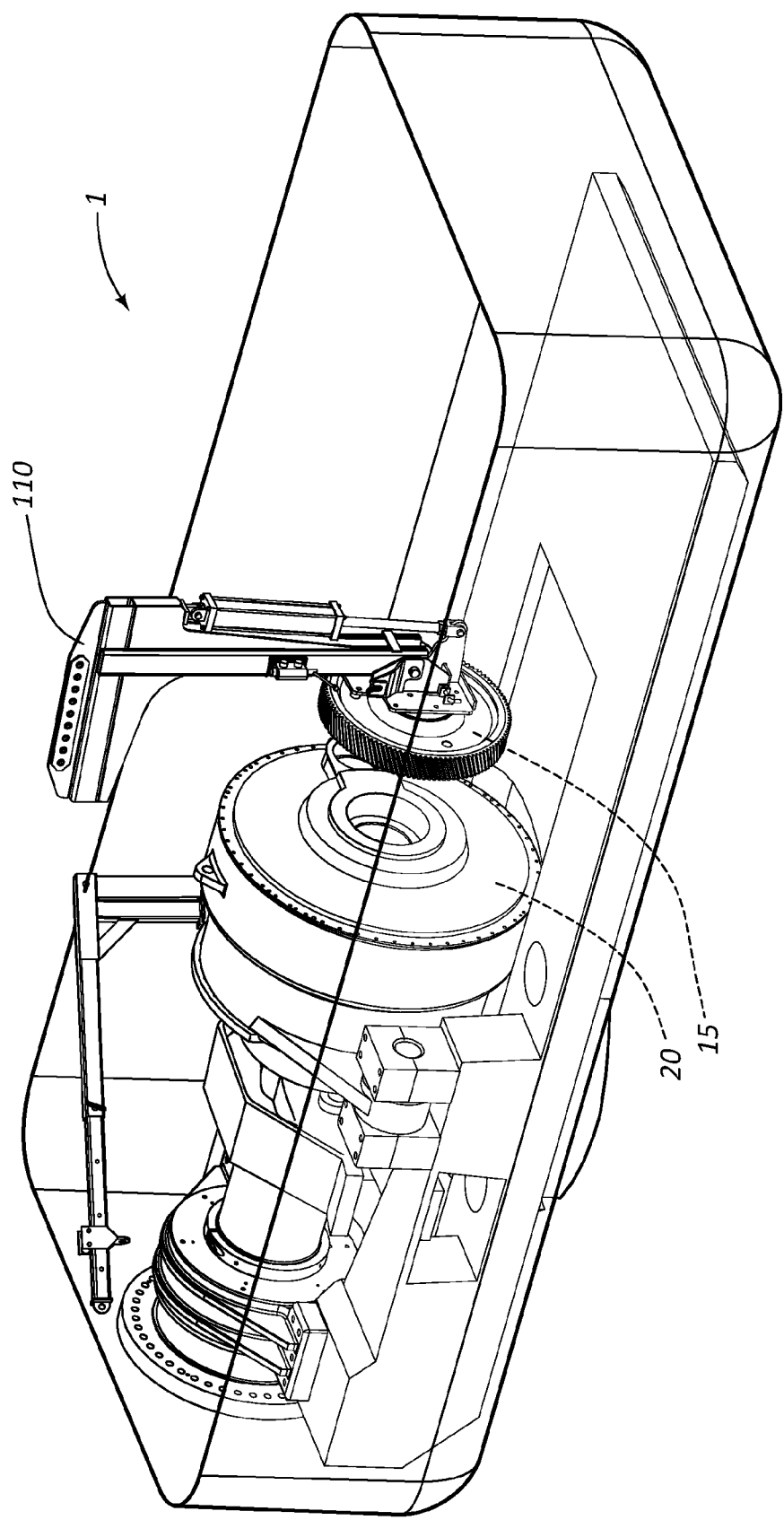
FIG. 12 is a perspective view of the gearbox of FIG. 7, shown with a lifting tool removing a high speed gear.

Once the output housing 10 is removed, the exposed high speed gear 15 may be removed from the gearbox. FIG. 12 is a perspective view of the gearbox 1, shown with the lifting tool 110 coupled to and removing the high speed gear 15. The lifting tool 110 may be configured to couple directly to the high speed gear 15, as shown in FIG. 12. Removal of the high speed gear 15 may then facilitate access to the mid-plate 20, disposed within the gearbox assembly.

Figure 13:
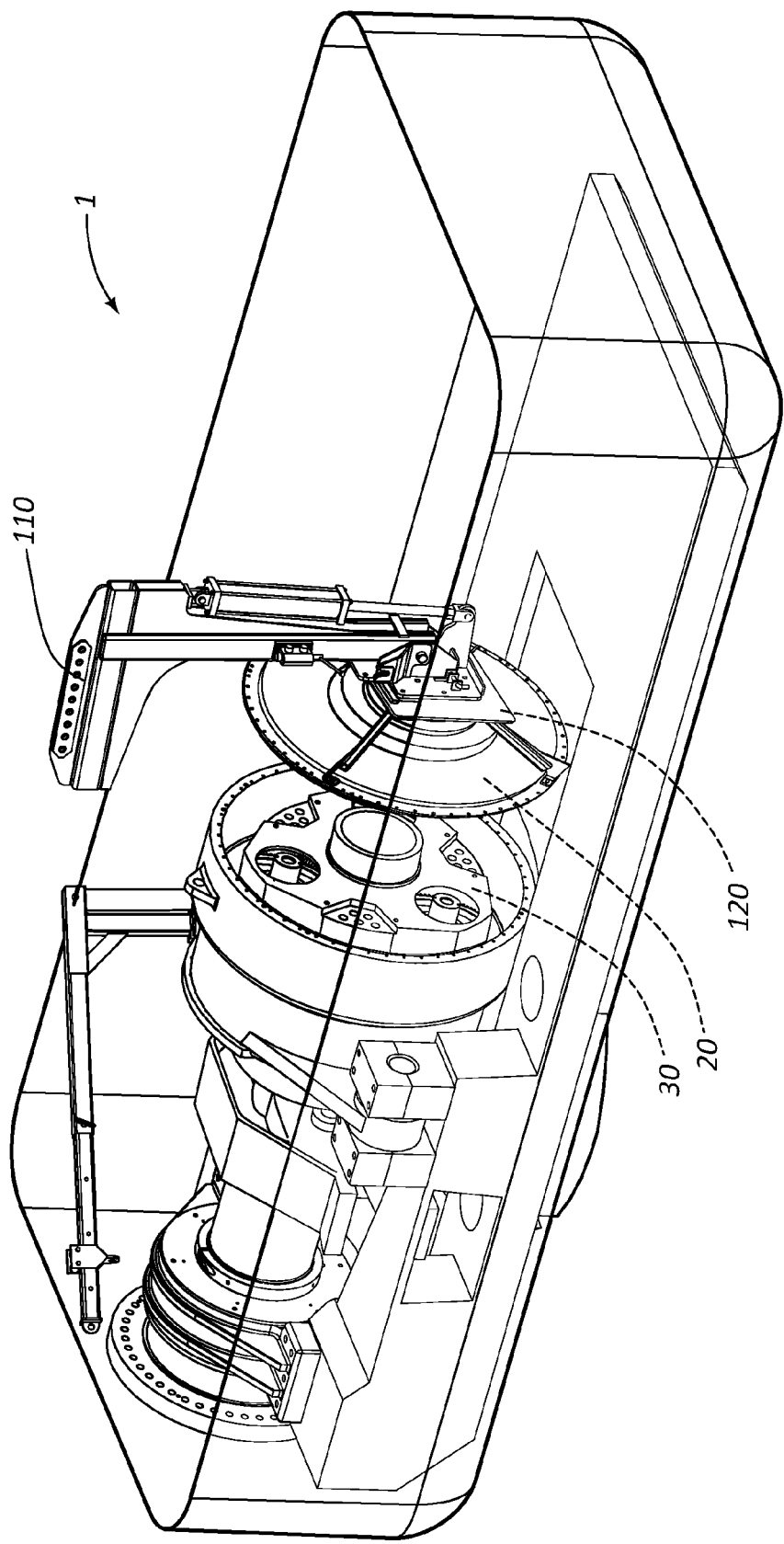
FIG. 13 is a perspective view of the gearbox of FIG. 7, shown with a lifting tool and plate adaptor removing the mid-plate.

As shown in FIG. 13, a perspective view of the gearbox 1 shown with the lifting tool 110 and plate adaptor 120 coupled to the mid-plate 20, the mid-plate 20 may then be removed to expose the planetary gears and associated components within the gearbox assembly. Specifically, removal of the mid-plate 20 may expose the output planetary carrier 30 of the gearbox.

Figure 14:
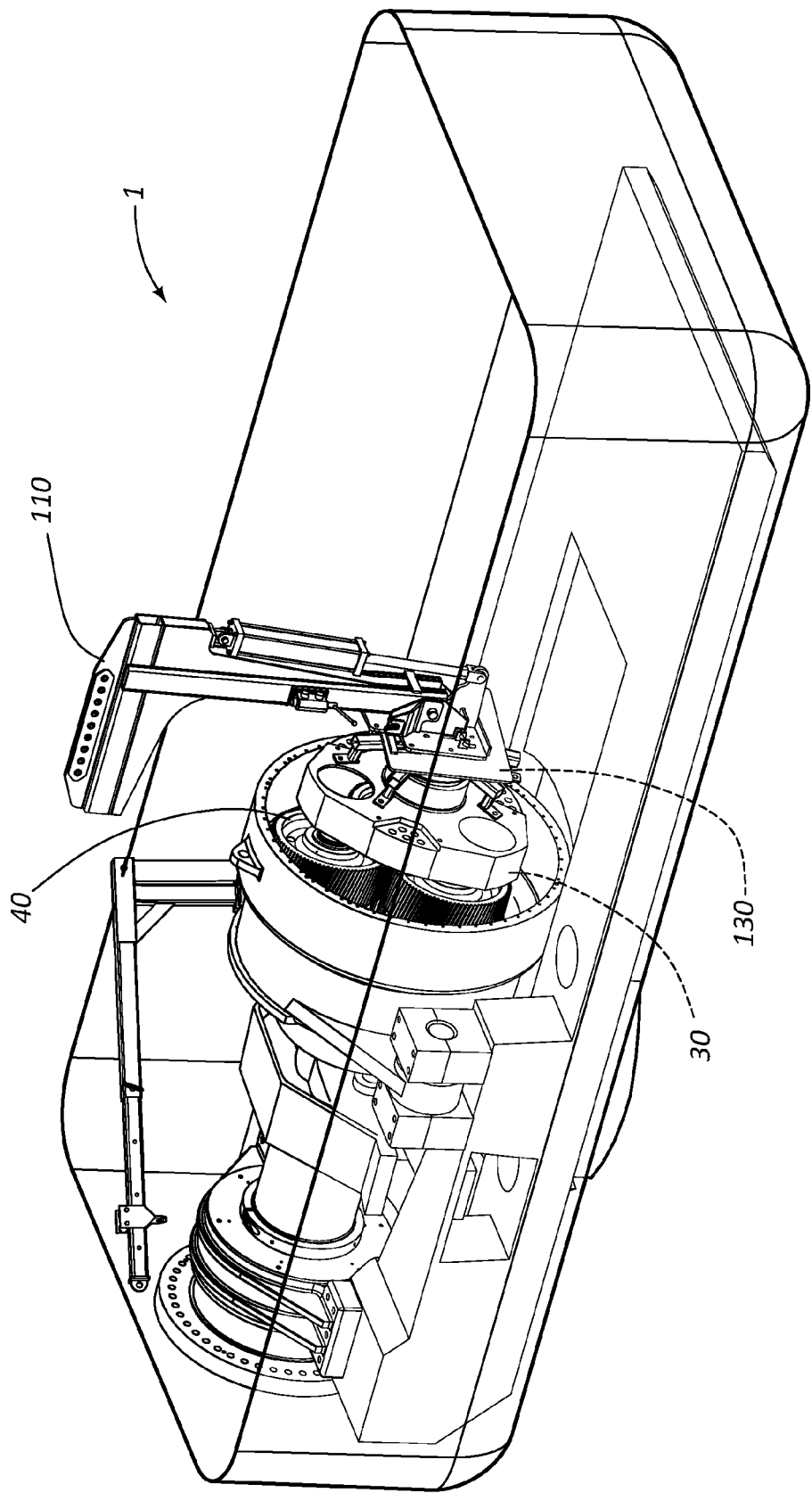
FIG. 14 is a perspective view of the gearbox of FIG. 7, shown with a lifting tool and planet carrier adaptor removing the output planetary carrier.
Figure 15:
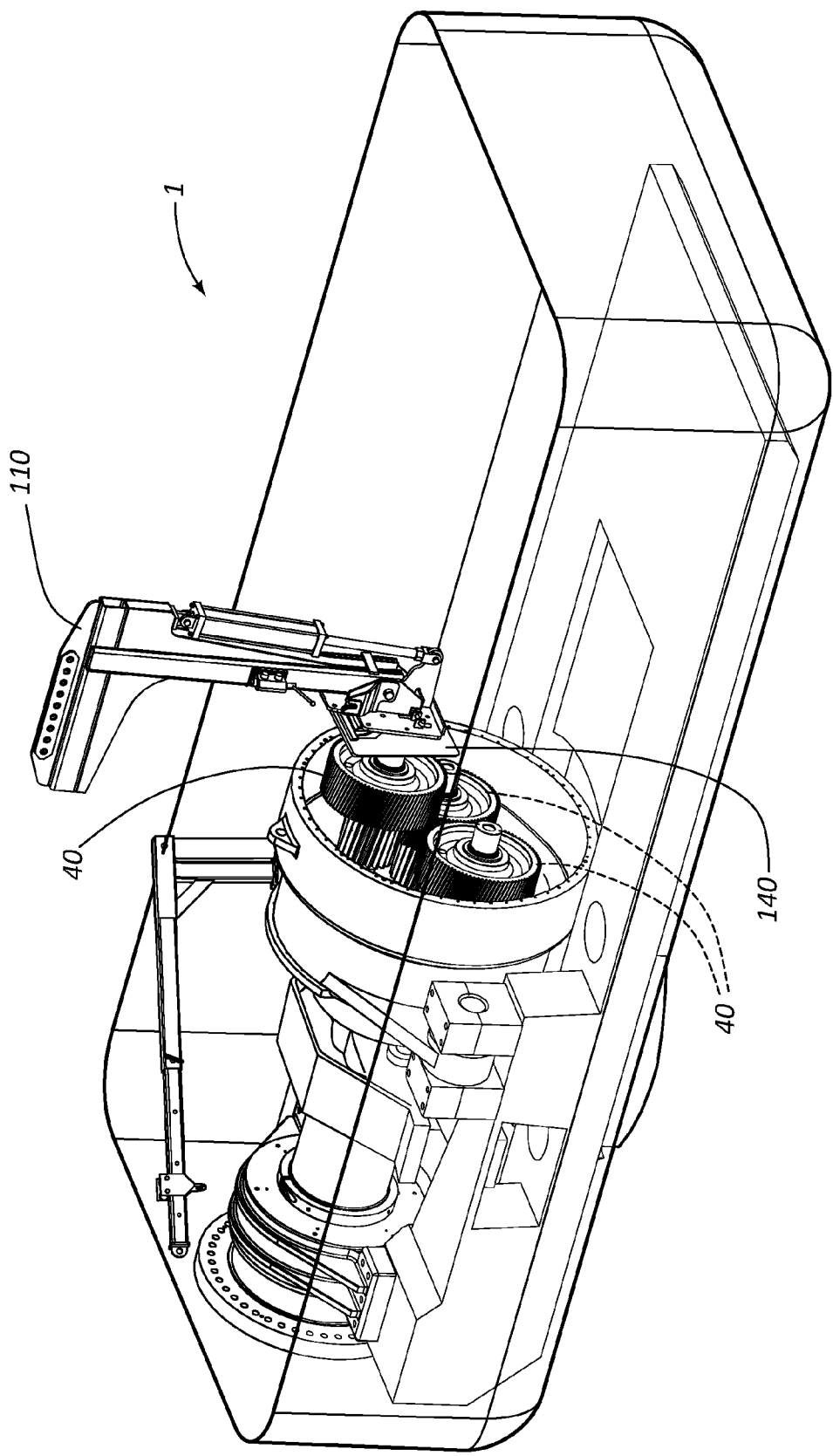
FIG. 15 is a perspective view of the gearbox of FIG. 7, shown with a lifting tool and planet adaptor removing a planet gear.
Figure 16:
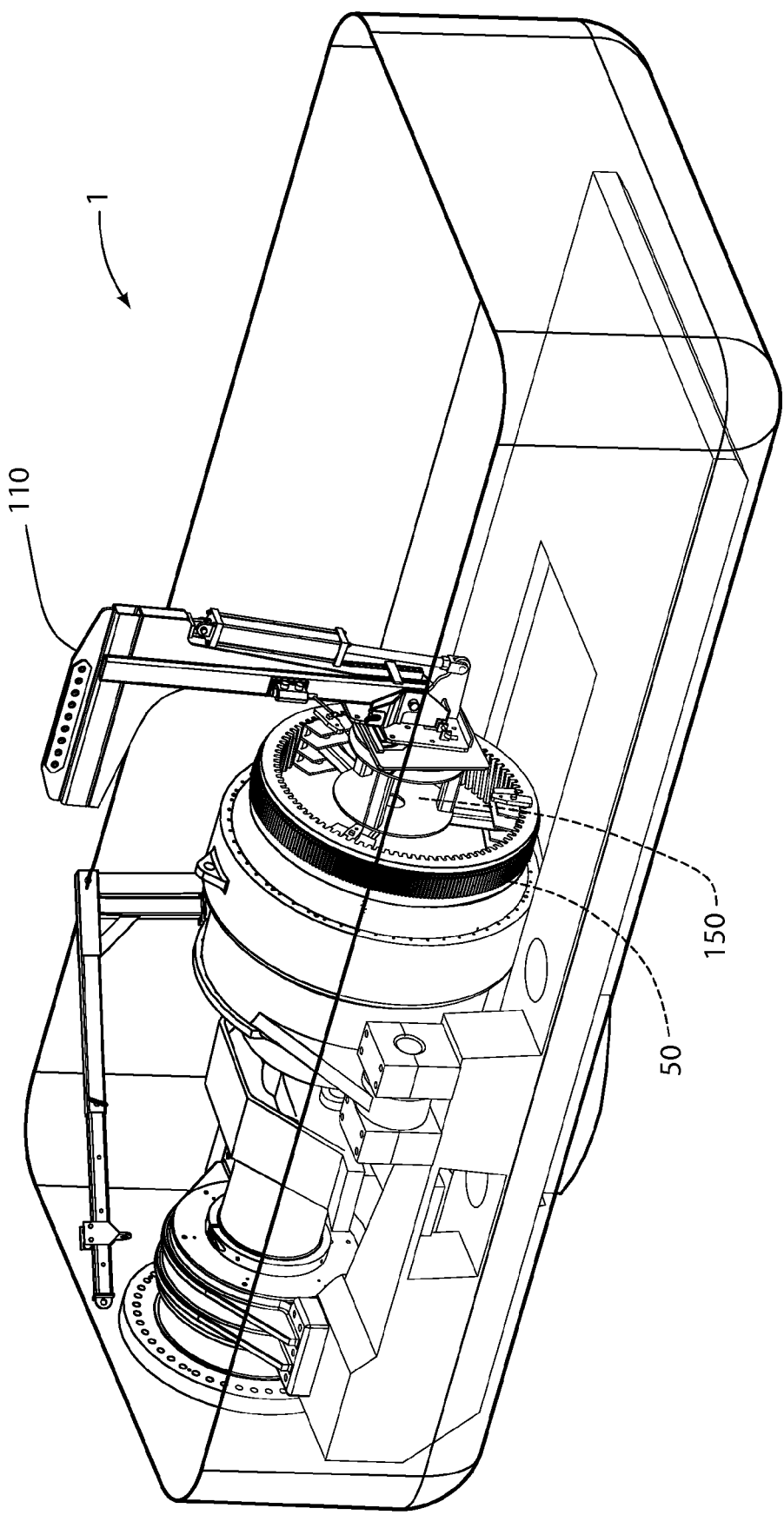
FIG. 16 is a perspective view of the gearbox of FIG. 7, shown with a lifting tool and ring adaptor removing the ring gear.

The output planetary carrier 30 may then be removed as shown in FIG. 14 by coupling the lifting tool 110 and the output planetary carrier adaptor 130 to the output planetary carrier 30. Removal of the output planetary carrier 30 may then expose the planet gears 40 of the gearbox 1. FIG. 15 shows the lifting tool 110 coupled to the planet gear adaptor 140, which may then be used to remove one or all of the planet gears 40. Once the planet gears 40 are removed, the ring gear 50 may then be removed using the lifting tool 110 and ring gear adaptor 150, as shown in FIG. 16.

Figure 17:
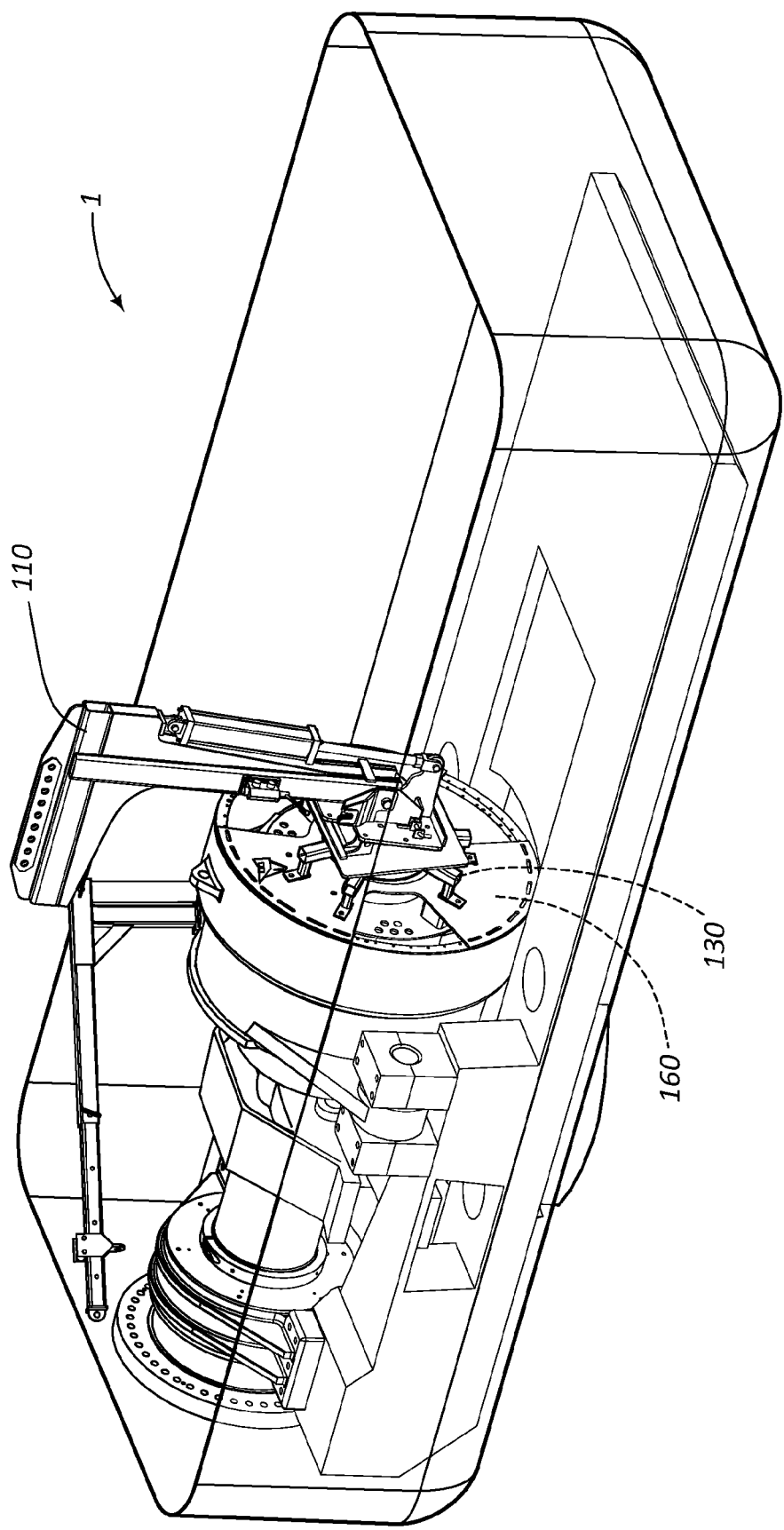
FIG. 17 is a perspective view of the gearbox of FIG. 7, shown with a lifting tool and planet carrier adaptor installing a rotor lock.

Upon removal of the components described above, the lifting tool 110 and the output planetary carrier adaptor 130 may then be used to hoist and install the rotor lock 160, as shown in FIG. 17. The rotor lock 160 may be configured to prevent rotation of components within the gearbox 1 and may be coupled to a housing, such as the input housing 60. The rotor lock 160 illustrated herein is exemplary, various designs and configurations of components configured to secure rotation of components of the gearbox 1 are within the scope of this disclosure. For example, a rotor lock that remains uptower in the housing may be used to prevent rotation of gearbox components. In the illustrated embodiment, the output planetary carrier adaptor 130 may be configured to couple to either the output planetary carrier (30 of FIG. 14) or the rotor lock 160. Any of the other adaptors may be designed or configured to mate with multiple components in this way. Further, the lifting tool 110 may be configured to mate directly with additional components in some embodiments.

The rotor lock 160 may work in conjunction with the main shaft support 5 to arrest the rotation of the assembly while portions of the gearbox 1 are displaced from the assembly. In some embodiments, the rotor lock 160 may be left in place as new parts are obtained, removed parts are repaired, and so forth.

After components are repaired or otherwise rebuilt, the entire assembly may be reassembled using an analogous procedure (in reverse order) to that described above. Further, procedures wherein fewer or additional components are removed are within the scope of the disclosure. Components may be removed for repair, replacement, refurbishment, lubrication, replacement of seals, and so forth.

Figure 18:
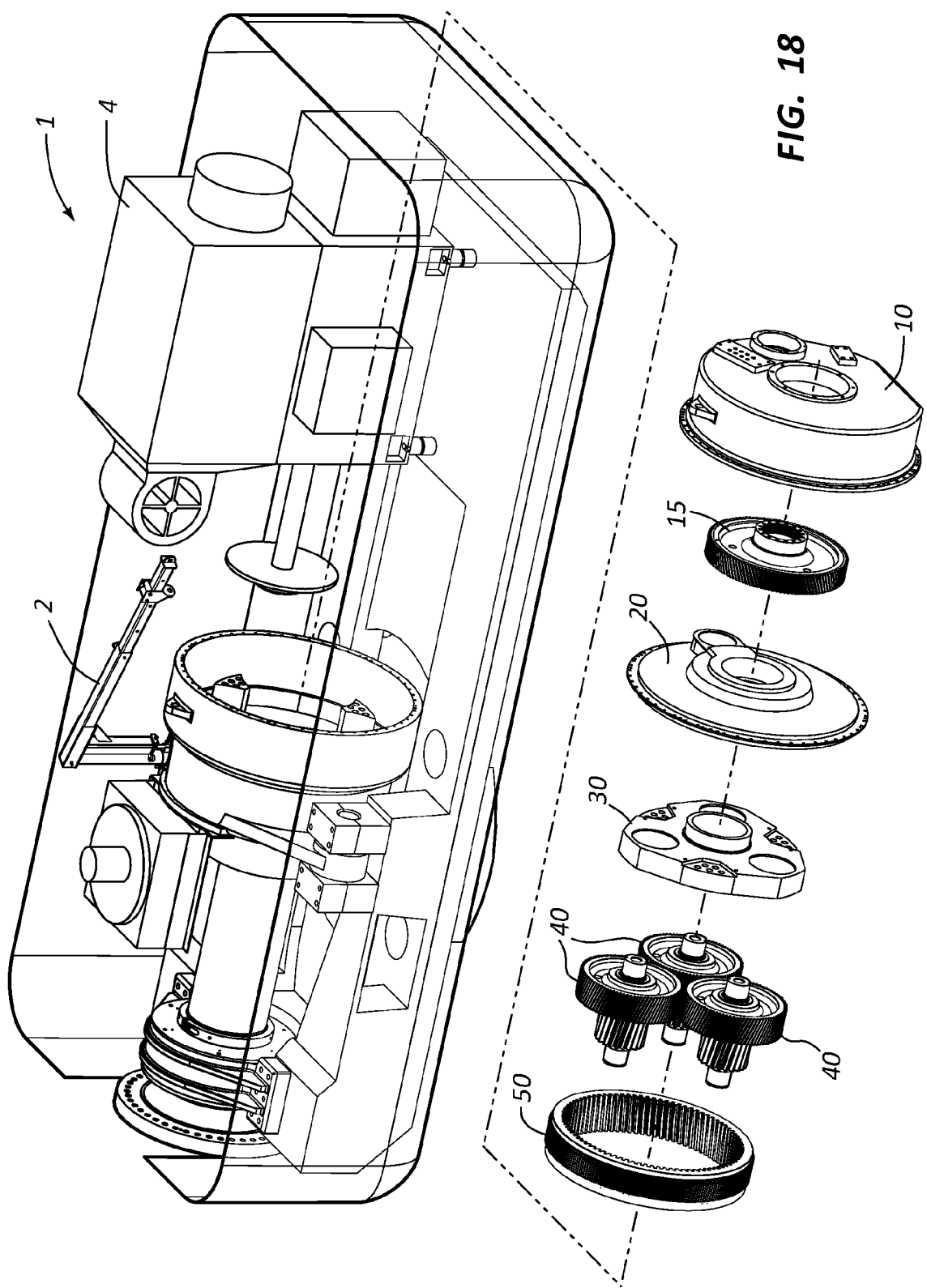
FIG. 18 is a partially exploded view of the gearbox of FIG. 7.

FIG. 18 is a partially exploded view of the gearbox 1 showing the relative position of various components. Again, any number or subset of these components may be removed, reinstalled, replaced, or so forth. FIG. 18 illustrates the gearbox 1, the jib crane 2, and the generator and oil cooler 4. Additional components of the gearbox 1, including the output housing 10, high speed gear 15, mid-plate 20, output planetary carrier 30, planet gears 40, and ring gear 50, are shown in an exploded configuration.

Figure 19:
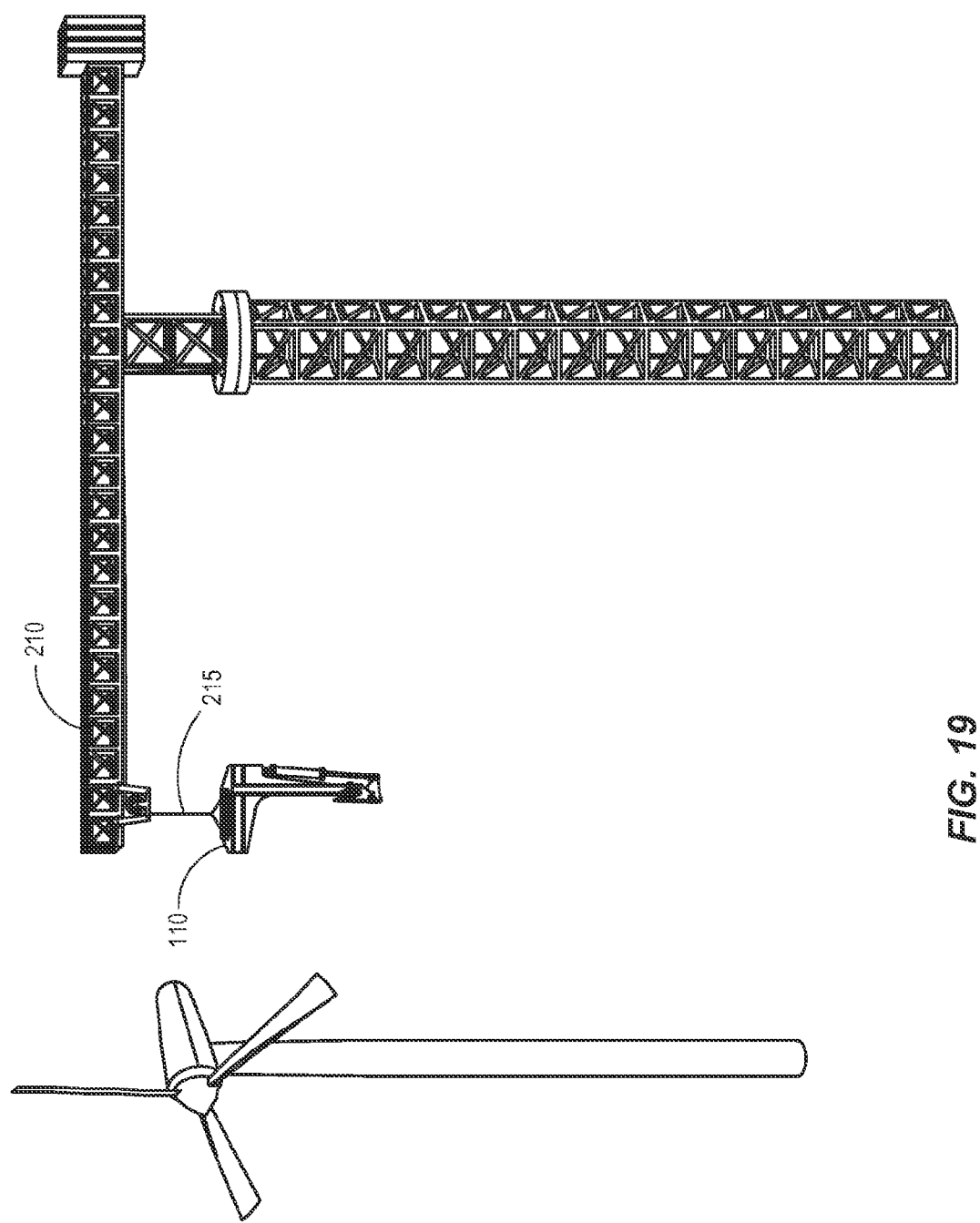
FIG. 19 is a perspective view of a crane coupled to a lifting tool.

FIG. 19 is a perspective view of a crane 210 coupled to a lifting tool 110. The crane 210 may include a crane cable 215, which may couple to holes or other attachment points of the lifting tool 110. The crane 210 may manipulate the position of the lifting tool 110 to align it with components of the gearbox.

Without further elaboration, it is believed that one skilled in the art can use the preceding description to utilize the present disclosure to its fullest extent. The examples and embodiments disclosed herein are to be construed as merely illustrative and exemplary and not as a limitation of the scope of the present disclosure in any way. It will be apparent to those having skill in the art, and having the benefit of this disclosure, that changes may be made to the details of the above-described embodiments without departing from the underlying principles of the disclosure herein.

The invention claimed is:

1. A system for maintaining an uptower wind turbine gearbox comprising:
    an L-shaped lifting tool configured to be coupled to a crane lifting device, wherein the lifting tool comprises:
        a horizontal first portion including a crane cable coupling section comprising a plurality of holes, wherein the plurality of holes is positioned to maintain the lifting tool in a predetermined orientation relative to the crane cable when coupled to the crane cable,
        a vertical second portion, the second portion coupled directly to and extending from the first portion,
        an interface portion extending from a terminal end of the second portion,
        a coupling member directly coupled to the interface portion and extending horizontally from the interface portion, and
        a hydraulic ram operably coupled to the coupling member and the first portion, the hydraulic ram configured to rotate the coupling member relative to the first portion and second portion when operated; and
    a plurality of rigid adaptors configured to removably couple to the coupling member lifting tool, wherein each adaptor is sized and shaped to removably couple with at least one corresponding component of the gearbox coupled to a main shaft of the gearbox.

2. The system of claim 1, wherein an adaptor of the plurality of adaptors comprises a plate adaptor comprising:
    a central coupling portion including fasteners configured to couple to the interface portion of the L-shaped lifting tool;
    a plurality of arms extending from the central coupling portion in a direction that includes a radial direction and a lateral direction away from the interface portion; and
    a set of plate fasteners coupled to the plurality of arms and configured to engage with a plate component of the gearbox.

3. The system of claim 1, wherein an adaptor of the plurality of adaptors comprises a planet carrier adaptor comprising:
    a central coupling portion including fasteners configured to couple to the interface portion of the L-shaped lifting tool;
    a plurality of arms extending from the central coupling portion in a direction that includes a radial direction;
    a plurality of coupling arms extending from the plurality of arms in a direction that includes a lateral direction away from the interface portion; and
    a set of planet carrier fasteners coupled to the plurality of coupling arms and configured to engage with a planet carrier component of the gearbox.

4. The system of claim 1, wherein an adaptor of the plurality of adaptors comprises a planet gear adaptor comprising:
    a central coupling portion including fasteners configured to couple to the interface portion of the L-shaped lifting tool;
    a gear interface extension extending from the central coupling portion in a direction that includes lateral direction away from the interface portion configured to engage with a planet gear component of the gearbox.

5. The system of claim 1, wherein an adaptor of the plurality of adaptors comprises a ring gear adaptor comprising:
    a central coupling portion including fasteners configured to couple to the interface portion of the L-shaped lifting tool;
    a central support member attached to the central coupling portion;
    a plurality of arms extending from the central coupling portion in a direction that includes a radial direction;
    a plurality of coupling members extending radially from the plurality of arms and configured to engage with at least a portion of the inside of the ring gear component of the gearbox.

6. The system of claim 1, wherein the second portion descends vertically relative to the ground from the first portion when the first portion is suspended from the crane cable.

7. The system of claim 1, wherein the coupling member includes a mounting surface, wherein when the first portion is suspended from the crane cable, the mounting surface faces horizontally relative to the ground in a first orientation, and wherein each rigid adaptor is configured to removably couple to the mounting surface.

8. The system of claim 1, wherein one of the plurality of rigid adaptors includes a cylindrical extension configured to be inserted through a center of a planet gear.

9. The system of claim 1, wherein one of the plurality of rigid adaptors includes a plurality of arms configured to engage an inner cylindrical surface of a ring gear.

* * * * *